(12) United States Patent
Yu et al.

(10) Patent No.: US 8,893,149 B2
(45) Date of Patent: Nov. 18, 2014

(54) TASK-BASED PROCESS DEFINITION

(75) Inventors: Jai Yu, Fremont, CA (US); Karn Choi, Seattle, WA (US); Stephan Otto Brunner, Lafayetta, CA (US); Do Joon Ra, Mountain View, CA (US); Guo Chew Lam, Foster City, CA (US); Aibek Musaev, San Mateo, CA (US); Ashley Grant Stirrup, Burlingame, CA (US); Tarri E. Furlong, San Leandro, CA (US); Yong Li, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1564 days.

(21) Appl. No.: 11/931,305

(22) Filed: Oct. 31, 2007

(65) Prior Publication Data
US 2008/0046834 A1    Feb. 21, 2008

Related U.S. Application Data

(62) Division of application No. 10/177,534, filed on Jun. 21, 2002, now Pat. No. 7,640,548.

(51) Int. Cl.
| | | |
|---|---|---|
| *G06F 9/46* | (2006.01) | |
| *G06Q 10/00* | (2012.01) | |
| *G06Q 10/06* | (2012.01) | |
| *G06Q 10/10* | (2012.01) | |

(52) U.S. Cl.
CPC .......... *G06Q 10/10* (2013.01); *G06Q 10/06316* (2013.01)
USPC ........................................ 718/106; 705/7.26

(58) Field of Classification Search
USPC ....................................................... 718/106
See application file for complete search history.

(56) References Cited

U.S. PATENT DOCUMENTS

| | | | |
|---|---|---|---|
| 5,490,097 A | * | 2/1996 | Swenson et al. ................... 703/2 |
| 5,892,512 A | | 4/1999 | Donnelly et al. ............. 345/349 |

(Continued)

FOREIGN PATENT DOCUMENTS

| | | | | |
|---|---|---|---|---|
| JP | 10-500510 | 1/1998 | ................ | G06F 9/46 |
| JP | 10-91413 | 4/1998 | ................ | G06F 9/06 |

(Continued)

OTHER PUBLICATIONS

Besty Beier, Misha W. Vaughan, The Bull's-Eye: A Framework for Web Application User Interface Design Guidelines, CHI 2003: New Horizons, Paper: Web Usability, Volume No. 5, Issue No. 1, Apr. 5-10, 2003, pp. 489-496.

(Continued)

*Primary Examiner* — Abdullah Al Kawsar
(74) *Attorney, Agent, or Firm* — Campbell Stephenson LLP

(57) ABSTRACT

A facility for guiding users through a series of steps or tasks, often associated with a process, is described. The facility assigns tasks or steps to users having roles identified with the task or step. The role associated with the task or step may change depending on the state of the task or step. When the role associated with a task or step changes, the facility may assign the task or step to another user. The facility guides a user through a task or step by providing instructions and other information, such as data tables and user input fields, that may be used to complete the task or step. The facility provides for the definition of processes by allowing users to specify tasks, steps and instructions relating to processes.

12 Claims, 23 Drawing Sheets

(56) References Cited

U.S. PATENT DOCUMENTS

| | | | |
|---|---|---|---|
| 6,496,872 B1 | 12/2002 | Katz et al. | 709/318 |
| 6,985,876 B1 | 1/2006 | Lee | 705/27 |
| 2001/0044738 A1* | 11/2001 | Elkin et al. | 705/8 |
| 2002/0007300 A1* | 1/2002 | Slatter | 705/9 |
| 2002/0065701 A1* | 5/2002 | Kim et al. | 705/9 |
| 2002/0065879 A1* | 5/2002 | Ambrose et al. | 709/203 |
| 2002/0073001 A1 | 6/2002 | Palmer et al. | 705/29 |
| 2002/0078432 A1* | 6/2002 | Charisius et al. | 717/102 |
| 2003/0004767 A1* | 1/2003 | Ohsaki | 705/7 |
| 2003/0074090 A1* | 4/2003 | Becka et al. | 700/83 |
| 2003/0204433 A1* | 10/2003 | Botscheck et al. | 705/9 |
| 2004/0205572 A1* | 10/2004 | Fields et al. | 715/513 |
| 2008/0127189 A1* | 5/2008 | Braun et al. | 718/102 |
| 2008/0228657 A1 | 9/2008 | Nabors et al. | 705/80 |

FOREIGN PATENT DOCUMENTS

| | | | | |
|---|---|---|---|---|
| JP | 10-154177 | 6/1998 | | G06F 17/60 |
| WO | WO 01/75747 A1 | 10/2001 | | G06F 17/60 |

OTHER PUBLICATIONS

Hoffman, Marc, David Shute and Mike Ebbers, Image and Workflow Library: Advanced Workflow Solutions using IBM FlowMark; International Technical Support Organization; available via the Internet at http://www.redbooks.ibm.com; Jan. 1999; pp. i-viii; 1-141.

IBM Corp., "Business Process Reengineering and Beyond," International Support Organization; Dec. 1995; pp. i-xx; 1-197.

* cited by examiner

TASK-BASED PROCESS DEFINITION

CROSS-REFERENCE TO RELATED APPLICATIONS

This application is a divisional of U.S. application Ser. No. 10/177,534, entitled "TASK BASED USER INTERFACE," filed on Jun. 21, 2002, and naming Jai Yu; Karn Choi; Stephan Brunner; Do Joon Ra; Chew Lam; Aibek Musaev; Ashley Stirrup; Tani Furlong and Yong Li as inventors; which is now U.S. Pat. No. 7,640,548; issued on Dec. 29, 2009. This application is incorporated by reference herein, in its entirety and for all purposes.

TECHNICAL FIELD

This invention relates generally to guiding users through tasks associated with a process.

BACKGROUND

Many business organizations have developed sophisticated user interfaces to facilitate the completion of processes such as sales processes, product design processes, processes associated with providing services, etc. Typically, such processes require substantial data entry and retrieval. Organizations may build the user interfaces that facilitate the completion of such processes using a set of screens and viewing components (e.g., views and applets) that expose a pre-defined set of fields in a pre-defined user interface metaphor.

As user interfaces become increasingly rich and complex, however, performing standard operations such as creating an account, creating a service request, creating a quote, accessing a price list, creating a business opportunity and following a process to the successful completion of an order becomes increasingly challenging. A standard task may be associated with a steep learning curve because the functionality that corresponds with the task is buried somewhere within sub-tabs of viewing components. Sometimes, organizations have no choice but to provide extensive training for employees, which can be costly and time consuming for the organization. Also, because the preferred method for completing a task (e.g., the "best practice") may be unclear throughout an organization, the organization may experience less than desirable results with respect to the completion of tasks due to inconsistencies in the way employees within the organization perform certain tasks.

The completion of tasks within an organization may be further complicated by the use of multi-task processes requiring a division of tasks among two or more individuals within the organization. For example, in the context of a sales quote, a sales agent may be responsible for the task or step of creating a quote, while a sales manager may be responsible for the task or step of approving that quote. While the sales agent may manually provide notice to the sales manager once the quote is ready for approval, providing such notice adds another unnecessary step to the task or and increases the likelihood that the results of the overall process will suffer from inconsistencies and inefficiencies. Moreover, when providing such notice is required, it becomes difficult to retain coherence between a particular task and the instructions required to complete that task.

Accordingly, it would be desirable to have an easy-to-use facility that provides in-line support to users as they complete tasks ranging from simple to complex and allows various individuals involved in completing a multi-task process to receive notice of a task as soon as the task becomes available or necessary.

BRIEF DESCRIPTION OF THE DRAWINGS

FIG. 6 is a sample user interface showing various viewing components on an admin process definition page.

FIG. 7 is a sample user interface showing various viewing components on a process details page.

FIG. 9 is a sample user interface showing various viewing components on a task definition page.

FIG. 11 is a sample user interface showing various viewing components on a task definition page.

FIG. 20 is a sample user interface showing a window or web page displaying a second step in a task guide for a specific task instance.

FIG. 21 is a sample user interface showing a window or web page displaying a third step in a task guide for a specific task instance.

FIG. 22 is a sample user interface showing a window or web page displaying a final step in a task guide for a specific task instance.

DETAILED DESCRIPTION

I. Introduction

A facility for guiding users through business tasks and processes is provided. In some embodiments, the facility allows administrative users to define processes such that specific instances of tasks associated with a process can be distributed appropriately throughout an organization. For example, a car dealership may have a process associated with the sale and service of cars. This process may be divided into a series of tasks, including advertising, providing product information to customers, handling sales transactions, providing a product warranty, providing post-purchase service and honoring warranty claims.

In some embodiments, the facility provides for associating general tasks with user roles that define the groups or individuals within the organization responsible for completing a task or step. For example, with respect to the car dealership example, management may assign mechanics with responsibility for post-purchase service, sales agents with responsibility for providing product information to customers, and finance specialists with responsibility for handling the steps associated with sales transactions.

In some embodiments, once these roles are defined, the facility appropriately distributes specific instances of a task. For example, once a sales agent working in the car lot determines that a customer wants to buy a particular car, she may indicate this decision using a palm-held electronic device. The facility then places a new instance of a task (e.g., "sales transaction 873") in the finance specialist's task inbox, located on the intranet homepage of her office computer.

In some embodiments, the facility allows administrative users within an organization to provide step-by-step instructions for completing processes and tasks in a manner consistent with practices favored by the organization. For example, referring back to the car dealership, management may decide that completing a sales transaction involves several distinct steps, including negotiating a price for the product, calculating the sales tax, determining the method of payment, instructing the purchaser to fill out the appropriate forms and tendering payment. For each of these steps within the task, management specifies a series of instructions, user interfaces and tools that define how the facility will guide the finance specialist through the steps necessary to complete a sales transaction in a manner consistent with the car dealership's best practices.

The advantages realized by the use of some embodiments of the facility include more efficient completion of both simple and complex tasks. In some embodiments, the facility may reduce the occurrence of incomplete tasks and ensure that users complete tasks in a manner consistent with an organization's best practices.

II. Facility Overview and Overall Architecture

Figure 1:
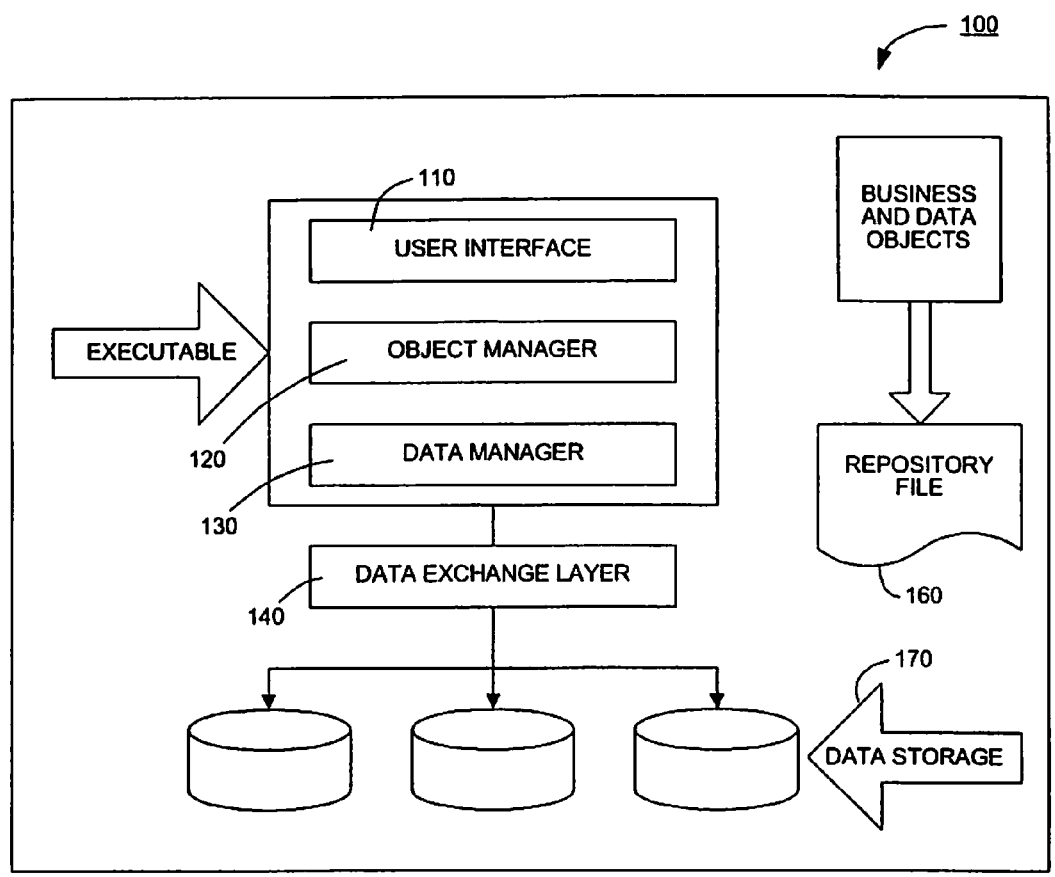
FIG. 1 shows a multi-layered system architecture in which the teachings of the present invention are implemented.

In some embodiments, a system in which the teachings of the present invention are implemented can be logically structured as a multi-layered architecture as shown in FIG. 1. In some embodiments, the logical multi-layered architecture as shown in FIG. 1 provides a platform for common services to support the various applications. These services may include a user interface layer 110, an object manager layer 120, a data manager layer 130 and a data exchange layer 140.

In some embodiments, the user Interface layer 110 may provide the applets, views, charts and reports, etc. associated with one or more applications. In some embodiments, various types of clients can be supported via the user interface layer 110. These various types of clients may include traditional connected clients, remote clients, thin clients over an intranet, Java thin clients or non-Windows-based operating systems, and HTML clients over the Internet, etc.

In some embodiments, the object manager layer 120 is designed to manage one or more sets of business rules or business concepts associated with one or more applications and to provide the interface between the user interface layer 110 and the data manager layer 130. In some embodiments, the business rules or concepts can be represented as business objects. In some embodiments, the business objects may be designed as configurable software representations of the various business rules or concepts such as accounts, contacts, opportunities, service requests, solutions, etc.

In some embodiments, the data manager layer 130 is designed to maintain logical views of the underlying data and to allow the object manager to function independently of underlying data structures or tables in which data are stored. In some embodiments, the data manager 130 may also provide certain database query functions such as generation of structure query language (SQL) in real-time to access the data. In some embodiments, the data manager 130 is designed to operate on object definitions in a repository file 160 that define the database schema. In some embodiments, the data storage services 170 provide the data storage for the data model associated with one or more applications.

In some embodiments, the data exchange layer is designed to handle the interactions with one or more specific target databases and provide the interface between the data manager layer 130 and the underlying data sources.

Figure 2:
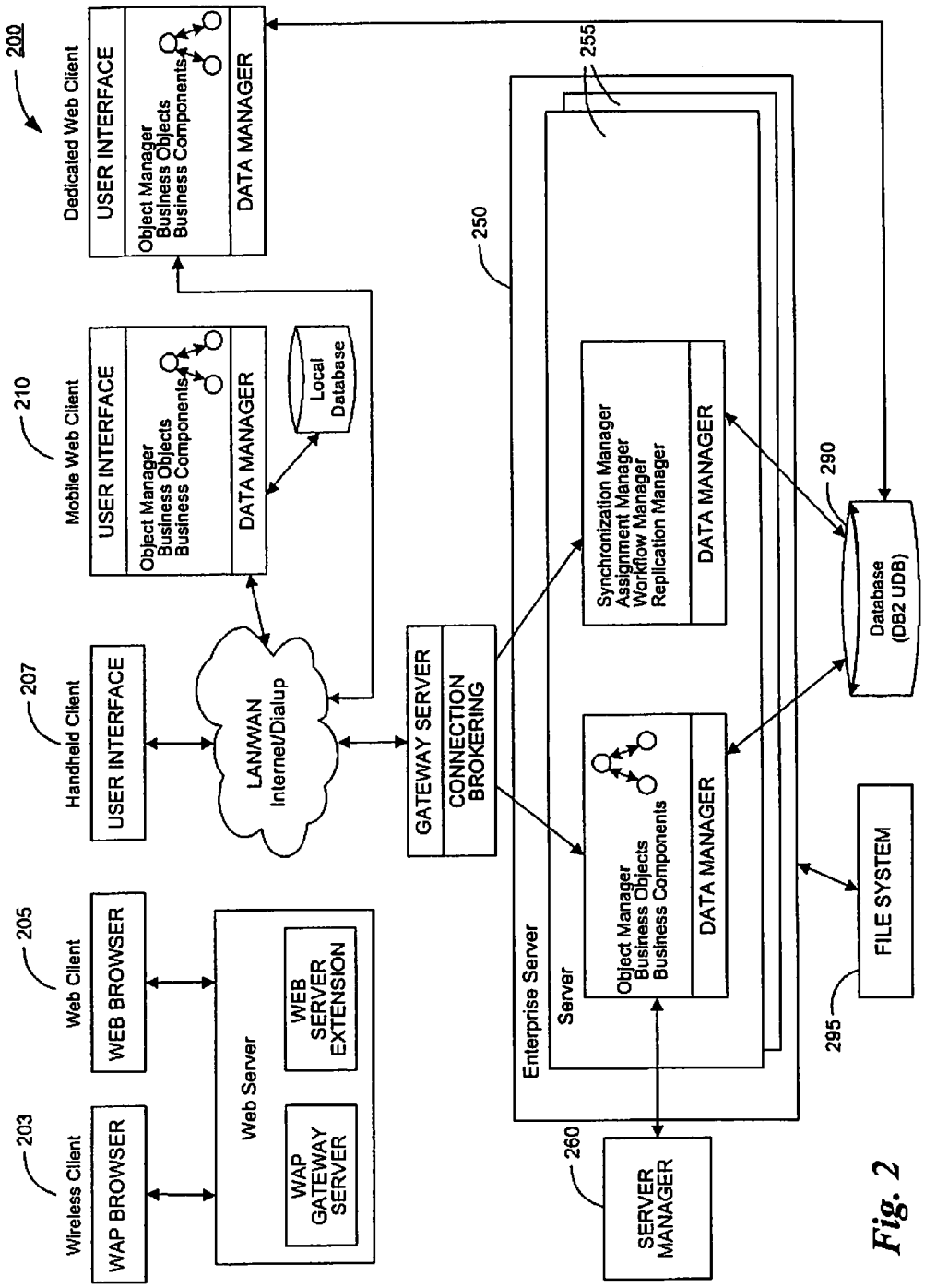
FIG. 2 shows a block diagram of one embodiment of a system configuration in which the teachings of the present invention are implemented.

FIG. 2 shows a block diagram of some embodiments of a system configuration in which the teachings of the present invention are implemented.

In some embodiments, the multi-layered architecture allows one or more software layers to reside on different machines. For example, in some embodiments, the user interface, the object manager and the data manager can all reside on dedicated web clients 200. For other types of clients such as the wireless clients 203, in some embodiments, the object manager and data manager can reside on a system server. It should be appreciated and understood by one skilled in the art that the system configuration shown in FIG. 2 is for illustrative and explanative purposes and may vary depending on the particular implementations and applications of the teachings of the present invention.

In some embodiments, the system environment illustrated in FIG. 2 may include more than one database 290. One or more subsets of the database 290 can be created or replicated by a replication manager. In addition, mobile web clients 210 can have additional remote databases (also called local databases). In some embodiments, unless the remote or local databases associated with the mobile web clients 210 are defined as read-only databases, these mobile web clients can create and update data locally that will ultimately be propagated up to the primary database when each mobile web client synchronizes with the system server.

In some embodiments, the database 290 is designed to store various types of data, including predefined data schema (e.g., table objects, index objects, etc.), repository objects (e.g., business objects and components, view definitions and visibility rules, etc.), and user's or customer's data. In some embodiments, dedicated web clients 200 and server components, including those that operate in conjunction with the other types of clients, can connect directly to the database 290 and make changes in real-time. In some embodiments, mobile web clients 210 can download a subset of the server's data to use locally, and periodically synchronize with the server database through the system server to update both the local and the server database.

In some embodiments, various tables included in the database 290 may be logically organized into the following types: data tables, interface tables, repository tables, etc.

In some embodiments, data tables may be used to store user business data, administrative data, seed data, transaction data, etc. In some embodiments, these data tables may be populated and updated through the various applications and processes. In some embodiments, data tables may include the base tables and the intersection tables. In some embodiments, base tables may contain columns that are defined and used by the various applications. In some embodiments, the base tables are designed to provide the columns for a business component specified in the table property of that business component. In some embodiments, intersection tables are tables that are used to implement a many-to-many relationship between two business components. They may also hold intersection data columns, which store information pertaining to each association. In some embodiments, intersection tables provide the data structures for association applets.

In some embodiments, interface tables are used to denormalize a group of base tables into a single table with which external programs can interface. In some embodiments, they may be used as a staging area for exporting and importing of data.

In some embodiments, repository tables contain the object definitions that specify one or more applications regarding:
 The client application configuration
 The mapping used for importing and exporting data
 Rules for transferring data to mobile clients
 In some embodiments, the file system 295 is a network-accessible directory that can be located on an application server.

In some embodiments, the file system 295 stores the physical files created by various applications, such as files created by third-party text editors, and other data that is not stored in the database 290. In some embodiments, physical files stored in the file system 295 can be compressed and stored under various naming conventions. In some embodiments, dedicated web clients 200 can read and write files directly to and from the file system 295. In some embodiments, mobile web clients 210 can have a local file system, which they periodically synchronize with the server-based file system 295. In some embodiments, other types of clients such as the wireless clients 203 and the web clients 205 can access the file system 295 via the system server.

In some embodiments, the enterprise server 250 is a logical grouping of the system servers 255 that share a common table owner or a database, point to a common gateway Server, and can be administered as a group using a server manager 260. In some embodiments, the connection to the gateway server can be established via TCP/IP. In some embodiments, the enterprise server 250 can be scaled effectively by deploying multiple system servers 255 in the enterprise server 250, thus providing a high degree of scalability in the middle tier of applications.

In some embodiments, the server 255 runs one or multiple server programs. It handles the incoming processing requests and monitors the state of all processes on the server. In some embodiments, server programs are designed and configured to perform one or more specific functions or jobs including importing and exporting data, configuring the database, executing workflow and process automation, processing to support mobile web clients 210 for data synchronization and replication, enforcing business rules, etc. In some embodiments, the server 255 can be an NT Service (under Windows NT operating system) or a daemon (e.g., a background shell process) under UNIX operating system. In some embodiments, the server 255 supports both multi-process and multi-threaded components and can operate components in batch, service and interactive modes.

In some embodiments, the server manager 260 is configured as a utility that allows common control, administration and monitoring across disparate programs for the servers 255 and the enterprise server 250. In some embodiments, the server manager 260 can be used to perform the following tasks: start, stop, pause and resume servers 255, components and tasks; monitor status and collect statistics for multiple tasks, components and servers within an enterprise server; and configure the enterprise server, individual servers, individual components and tasks, etc.

In some embodiments, the gateway server can be configured as a logical entity that serves as a single entry point for accessing servers. In some embodiments, it can be used to provide enhanced scalability, load balancing and high availability across the enterprise server. In some embodiments, the gateway server may include a name server and a connection brokering component. In some embodiments, the name server is configured to keep track of the parameters associated with the servers. For example, the availability and connectivity information associated with the servers can be stored in the name server. The various components in the system can query the name server for various information regarding the servers' availability and connectivity. In a Windows NT environment, the name server can be run as an NT service. In a UNIX environment, the name server can run as a daemon process. In some embodiments, the connection brokering component is used to perform load balancing functions such as directing client connection requests to an appropriate server (e.g., the least-busy server).

In some embodiments, as illustrated in FIG. 2, the various types of clients that can be supported by the system may include the following clients: dedicated web clients 200, mobile web clients 210, web clients 205, wireless clients 203 and handheld clients 207.

In some embodiments, dedicated web clients 200 (also called connected clients) are connected directly to a database server for data access via a LAN or WAN connection. In some embodiments, these connected or dedicated web clients do not store data locally. These dedicated web clients 200 can also access the file system directly. In some embodiments, the user interface, the object manager and the data manager layers of the multi-layered architecture reside on the dedicated web client 200.

In some embodiments, the mobile web clients 210 are designed and configured for local data access and thus can have their own local database and/or local file system. In some embodiments, mobile web clients 210 can interact with other components within the system via the gateway server. Through synchronization, the modifications from the local database and the server database can be exchanged. Mobile web clients 210 are described in more detail below.

In some embodiments, a web client 205 runs in a standard browser format from the client's machine. In some embodiments, the web client 205 can connect to a system server 255 through a web server. In some embodiments, the system server 255 is designed and configured to execute business logic and access data from the database 290 and file system 295. In some embodiments, the web client 205 described herein is designed and configured in accordance with the teachings of the present invention to operate in an interactive mode. In some embodiments, the interactive web client framework as described herein utilizes dynamically created objects implemented in JavaScript on the browser side that correspond to objects on the server side. In some embodiments, these dynamically created objects on the browser side may include the current view and its corresponding applets, the current business object and the corresponding business components, etc. The web client 205 is described in more detail below.

In some embodiments, wireless clients are essentially thin clients enabled on wireless devices. The wireless clients can use a wireless application protocol (WAP)-based user interface to communicate and exchange information/data with the system server.

The system configuration illustrated in FIG. 2 is described in more detail below with references to various structures, databases, tables, file systems, etc., as illustrating examples.

Figure 3:
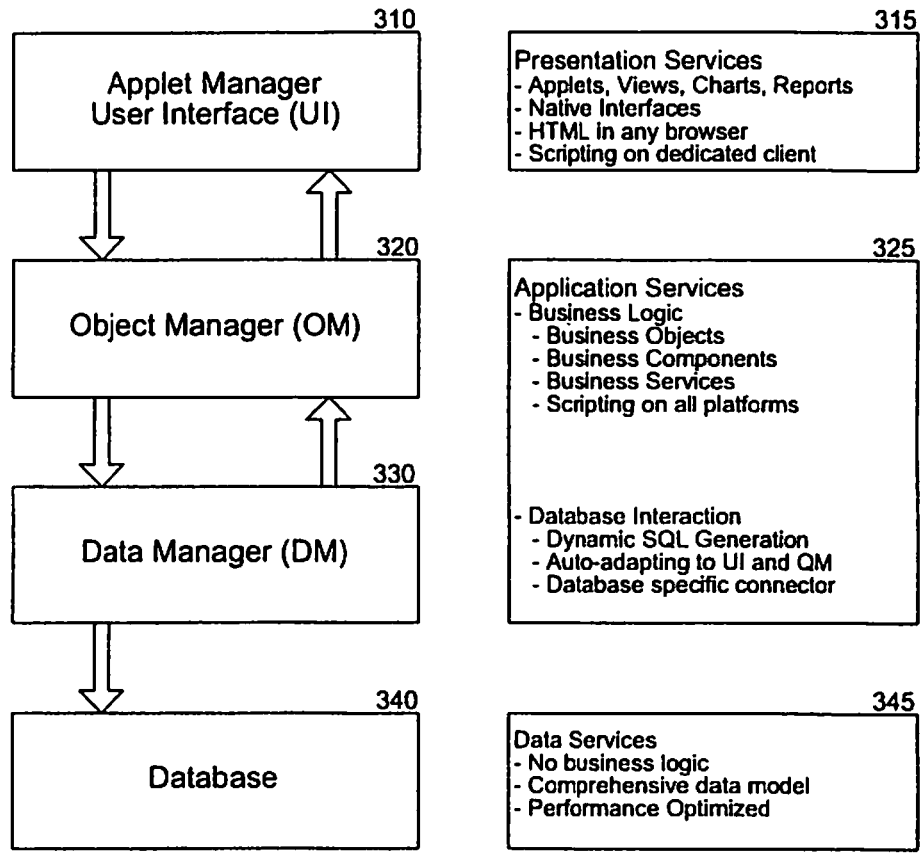
FIG. 3 shows a block diagram illustrating another logical representation of a multi-layered architecture in which applications can be built in accordance with the teachings of the present invention.

FIG. 3 shows a block diagram illustrating another logical representation of a multi-layered architecture in which applications can be built in accordance with the teachings of the present invention. Again, the multi-layered architecture as illustrated in FIG. 3 provides the configured platform for various common services designed to support the various applications. In some embodiments, these various services may include presentation services logic layer 315, which corresponds to an applet manager and user interface layer 310, application services logical layer 325, which corresponds to an object manager (OM) layer 320, and a data manager (DM) layer 330 and data services logical layer 345, which correspond to a database layer 340.

In some embodiments, the presentation services 315 may be designed and configured to support various types of clients and may provide them with user interface applets, views, charts and reports, etc. As described above, a large variety of clients may be supported (e.g., wireless clients, handheld clients, web clients, mobile web clients, dedicated (connected) clients, etc.).

In some embodiments, the application services 325 may include business logic services and database interaction services. In some embodiments, business logic services provide the class and behaviors of business objects and business components. In some embodiments, database interaction services may be designed and configured to take the user interface (UI) request for data from a business component and generate the database commands (e.g., SQL queries, etc.) necessary to satisfy the request. For example, the data interaction services may be used to translate a call for data into DBMS-specific SQL statements.

In some embodiments, data services 345 may be designed and configured to provide the data storage for the underlying data model that serves as the basis of the various applications. For example, the data model may be designed and configured to support various software products and applications including call center, sales, services and marketing, etc., as well as various industry vertical products and applications such as eFinance, eInsurance, eCommunications and eHealthcare.

Figure 4:
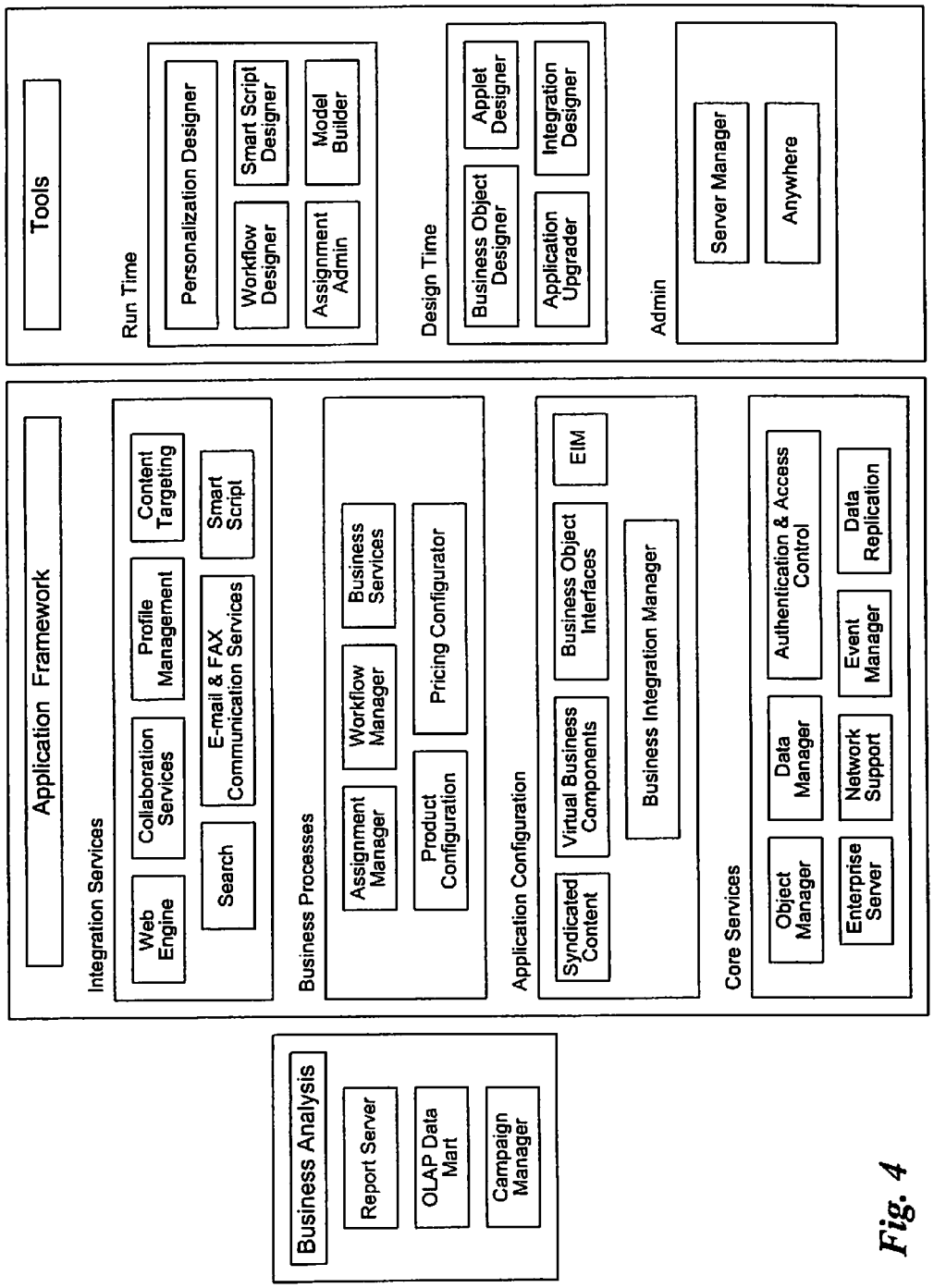
FIG. 4 illustrates a block diagram of one embodiment of an application framework in which the teachings of the present invention may be implemented.

FIG. 4 illustrates a block diagram of some embodiments of an application framework in which the teachings of the present invention may be implemented. As illustrated in FIG. 4, the application framework may include various logical groupings of various types of services and various types of tools that can be used to design and configure particular applications based on business needs and environments.

In some embodiments, the core services are designed and configured to provide the framework in which the applications execute. In some embodiments, the core services may include the following:

The enterprise server, which is the middle-tier application server

The networks that link all of these pieces together

Facilities like event manager and data replication, which allow sharing data between multiple installations of various applications, as well as between the various applications and other external applications The authentication, access control and security facilities.

In some embodiments, application integration services may be designed and configured to allow the various applications built in accordance with this framework to communicate with the external world. In some embodiments, the various types of services in this logical grouping may be designed and configured to provide for real-time, near-real-time and batch integration with external applications. For example, these integration services may be used to enable communications between external applications and internal applications using available methods, technologies and software products. In some embodiments, application integration services allow the systems or applications to share and replicate data with other external enterprise applications. Accordingly, these services allow a particular application or system to be both a client requesting information and a server having information requested from it.

In some embodiments, business processes services are designed and configured to allow the client to automate business processes through the application. In some embodiments, these various business process services may include the following:

Assignment of tasks through Assignment Manager

Enforcement of business practices through Workflow Manager

Reuse of custom business logic through Business Services

Ensuring proper product configuration and pricing through the Product Configurator and Pricing Configurator In some embodiments, creation of these business processes can be done through Run-Time tools such as Personalization Designer, Workflow Designer, SmartScript Designer, Assignment Administration Views and Model Builder.

In some embodiments, integration services may be designed and configured to provide the client with user interface and thin client support. In some embodiments, these may include capabilities for building and maintaining web-based applications, providing web support facilities such as user Profile Management, Collaboration Services and Email and Fax services, advanced Smart Scripting, etc.

In some embodiments, design time tools may be designed and configured to provide the services to customize, design, provide integration points and maintain the application. These various tools provide one common place to define the application.

In some embodiments, administrative services are designed and configured to provide one place to monitor and administer the application environment. In some embodiments, these services allow the user to administer the application either through a graphic user interface (GUI) or from a command line, etc.

III. Process, Task and Step Definition

Organizations attempting to facilitate the completion of processes may do so by providing definitions for processes. While FIGS. 5 through 16 describe one possible method of defining a process, one of ordinary skill in the art would recognize that organizations may implement many alternatives for defining a process without departing from the scope of the invention.

Figure 5:
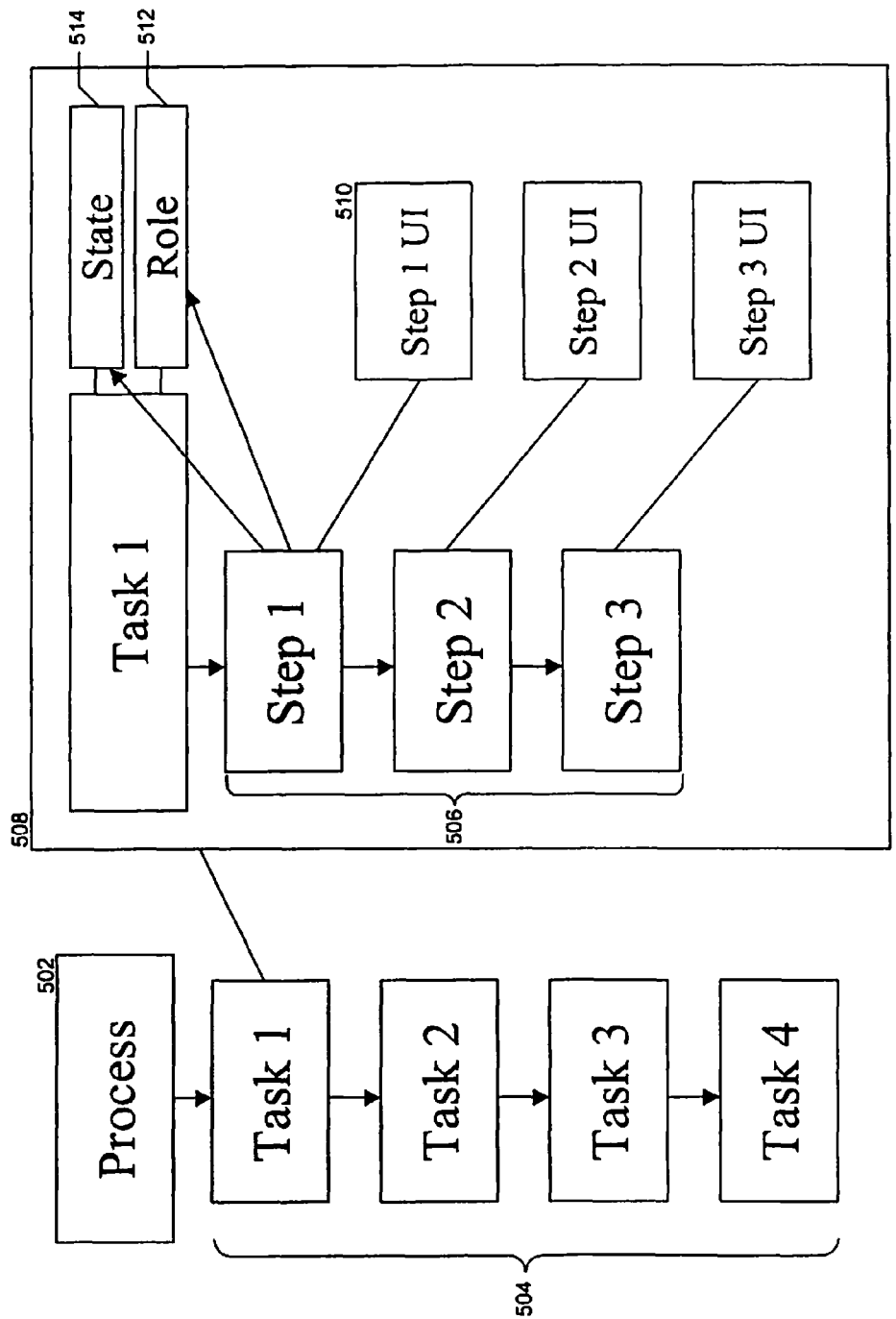
FIG. 5 shows a block diagram illustrating a sample representation of a process-task-step hierarchy.

FIG. 5 shows a block diagram illustrating a sample representation of a process-task-step hierarchy. In some embodiments, a process 502 may be divided into one or more tasks

504. These tasks can be further divided into steps 506 such as a creation step, an approval step and a completion step. In this way, complex processes are divided into more manageable subparts, which may be addressed by one or more individuals in a structured format.

Block 508 shows the details of a task in some embodiments. Each task may consist of a series of steps 506. For example, "TASK 1" in block 508 consists of three steps 506. In some instances, it may not be necessary for these steps to be completed in chronological order. In some embodiments, each step is associated with a separate user interface 510. The user interface 510, also called a viewing component (e.g., an object having a graphical representation that can be displayed on a computer screen and can interact with the user, such as a page, frame, panel, container, pane or applet), may contain instructions for completing the task. In some embodiments, to facilitate associating a task with a particular individual, each task is associated with a role 512. The role may be used to identify the individual or individuals that are responsible for the task at any given point in time. For example, the facility may rely on role values to identify the user inbox or inboxes in which a specific instance of a task should reside at any given time or state.

In some embodiments, each step or task may be a point where the overall task has to be assigned to a new person with another rule. Therefore, each step may also include data about a new role or another person to take over the task. Accordingly, the facility may automatically update the role as various steps of the task are completed. For example, once a user completes the step of inputting all the details for an expense report, he submits it to his manager for approval. Once submitted, the task is no longer visible for the original owner. In some embodiments, administrators define role rules at the time tasks are initially defined (i.e., design time), allowing the facility to automatically update roles at the time a step or task is completed (e.g. runtime). In some embodiments, the facility may permit users to manually define roles at the time a step of the task is being completed.

In some embodiments, each task is associated with a state or status 514 (e.g., "In Progress," "Completed," etc.). The individual states may be associated with a task's definitions and may be specified during design time. Like the role 512, the state 514 may change as the user proceeds through the various steps that are required to complete the task. In some embodiments, the facility may automatically update the state at the time each step is completed. For example, a task can start with the state "Started" and later transition into the state "Needs Approval" until it finally reaches the state "Complete." In some embodiments, the state may be altered or updated by the user at the time the user is completing a step. A change in a task's state may result in a change to the task's role.

FIGS. 6 through 16 are sample user interface diagrams showing screens or pages that facilitate the definition of processes, tasks and steps by an administrative user (herein, "admin user"). In some embodiments, the facility allows the admin user to define tasks, processes and steps in such a way that these items may relate to a variety of task instances associated with a task. For example, once an admin user creates an "Approve Quote" task that includes steps and instructions for approving quotes, these same steps and instructions may be used repeatedly to guide a user through accomplishing any specific instance of the task (e.g., approve quote No. 2256).

Figure 6:
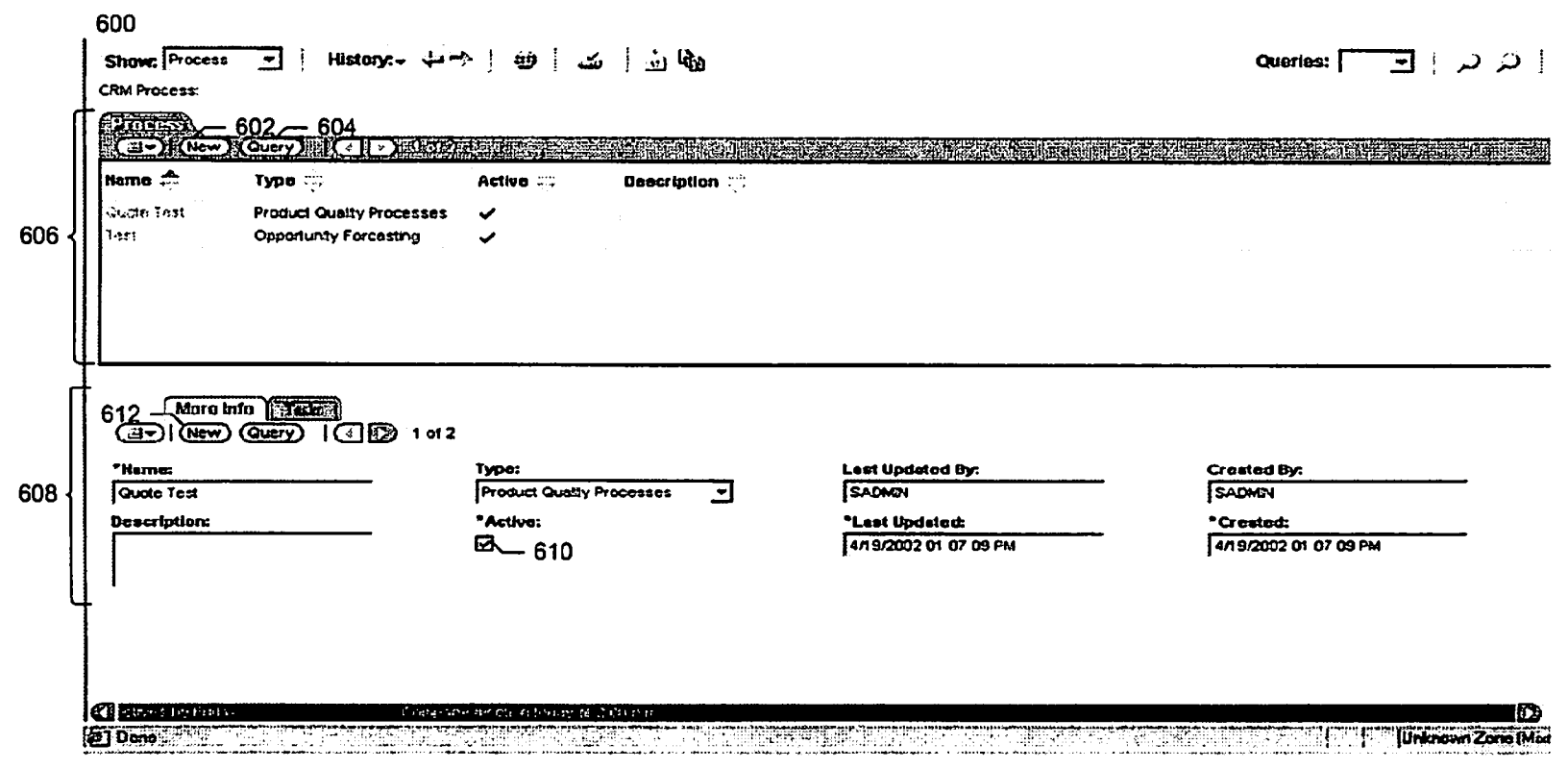

FIG. 6 is a sample user interface showing various viewing components on an admin process definition page 600. Via this page, an admin user may begin defining a process that ultimately includes outlining the tasks and steps involved in the process and creating instructions for various steps. In some embodiments, the admin user has the option of defining a new process by selecting a "NEW" button 602, or alternatively, modifying an existing process by running a query 604 to retrieve an already-defined process that is stored in a facility-accessible storage device.

In some embodiments, a "PROCESS" viewing component 606 displays all existing processes created by the admin user. If the admin user selects one of the displayed processes from the "PROCESS" viewing component 606, in some embodiments the facility displays details about that process in a "MORE INFO" viewing component 608. In some embodiments, the "MORE INFO" viewing component 608 shows the name, type and creator of a selected process, as well as dates associated with the process. In some embodiments, a status for the selected process may also be indicated. For example, if the status of the selected process is "active," the admin user may check an "ACTIVE" checkbox 610, indicating that this is the case. In some embodiments, the admin user may modify an existing process by entering in new values into the text fields and menus provided in the "MORE INFO" viewing component 608.

Figure 7:
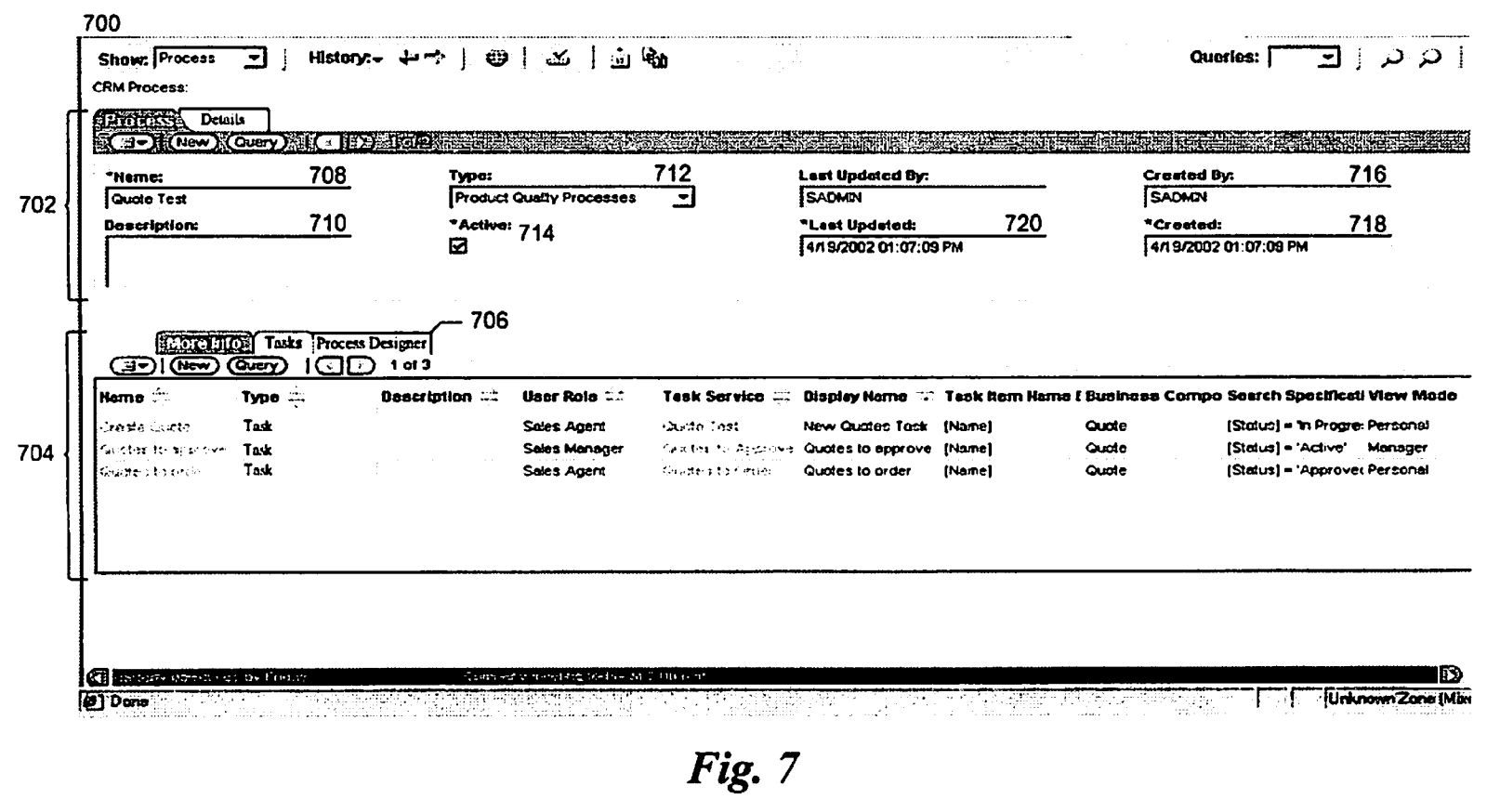

In some embodiments, selecting the "NEW" button from the "MORE INFO" viewing component 612 or the "PROCESS" viewing component 602 will cause the facility to display a process detail viewing component, such as the "PROCESS DETAILS" viewing component of FIG. 7. The process details viewing component may contain empty text fields and unselected menus from which a user may name and describe a new process FIG. 7 is a sample user interface showing various viewing components on a process details page 700. In some embodiments, using the text fields and pull-down menus in a "PROCESS DETAILS" viewing component 702, the user inputs information for a new process, such as a process name 708, process description 710, process type 712, process status 714 (e.g., active), creator name 716, date created 718 and last updated 720. In some embodiments, a "TASKS" viewing component 704 displays a series of tasks for the process. In some embodiments, if the admin user has not yet created tasks for the process, the admin user may select the "PROCESS DESIGNER" tab 706 to associate new tasks with the process. In some embodiments, selecting the "PROCESS DESIGNER" tab 706 will cause the display of a process design page, such as the process design page of FIG. 8, through which the admin user may assign tasks to a process.

Figure 8:
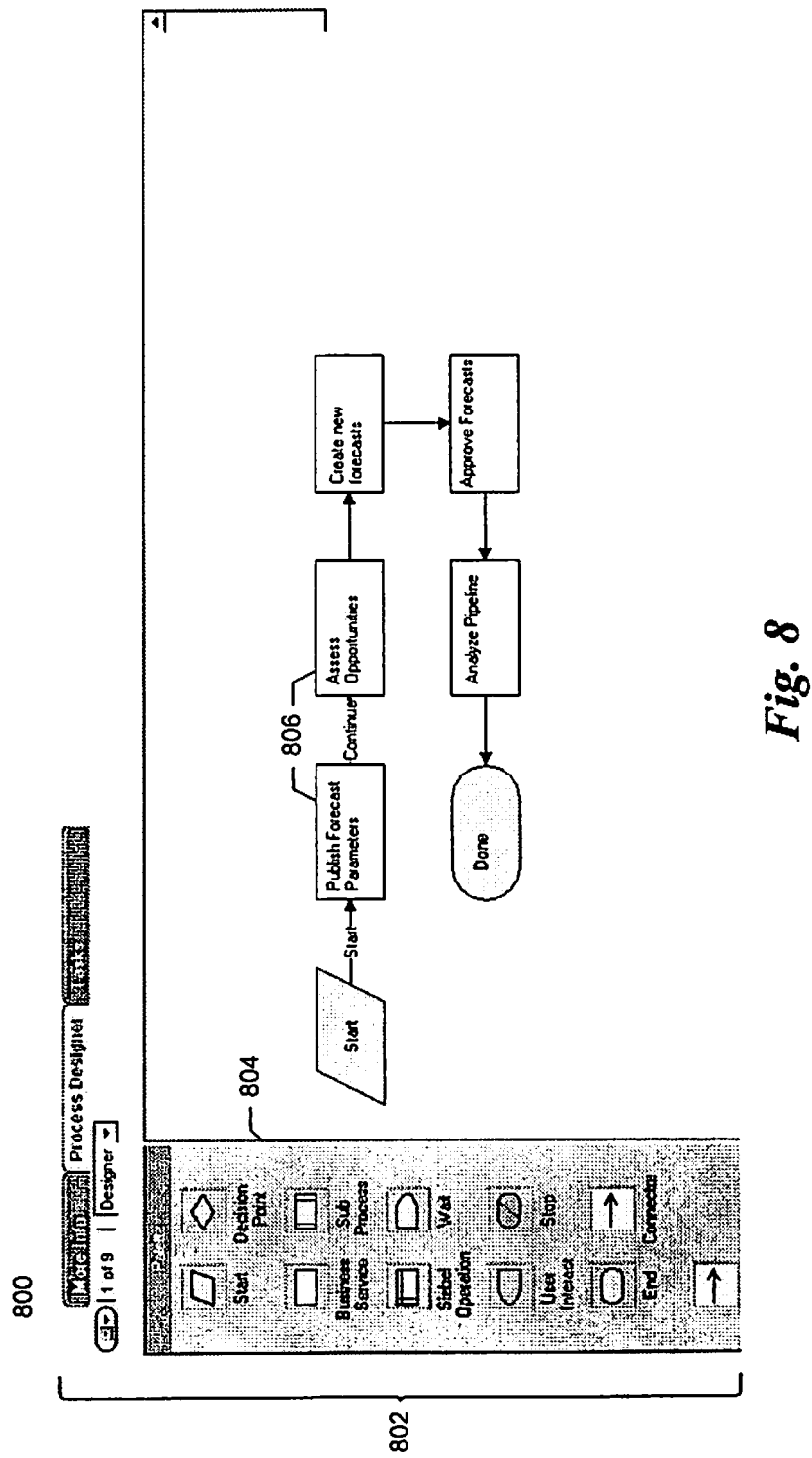
FIG. 8 is a sample user interface showing various viewing components on a process design page.

FIG. 8 is a sample user interface showing various viewing components on a process design page 800. From this page, the admin user may outline the tasks that make up a process. In some embodiments, the facility displays a "PROCESS DESIGNER" viewing component 802 that may include a design tool, such as a graphical designer palette 804, that allows the admin user to further define a process as a progression of tasks. While the design tool 804 allows the admin user to create custom tasks 806 for each process, in some embodiments the admin user may define a process by adding tasks from a list of existing tasks. By recycling existing tasks, the admin user avoids having to create an entirely new set of instructions for a step. Once the tasks in the process are identified, the admin user can then drill down into the tasks 806 defined on the "PROCESS DESIGNER" viewing component to proceed to a task definition page, such as the task definition page of FIG. 9. From the step definition page, the admin user can create instructions or modify the instructions and other attributes for the selected step.

Figure 9:
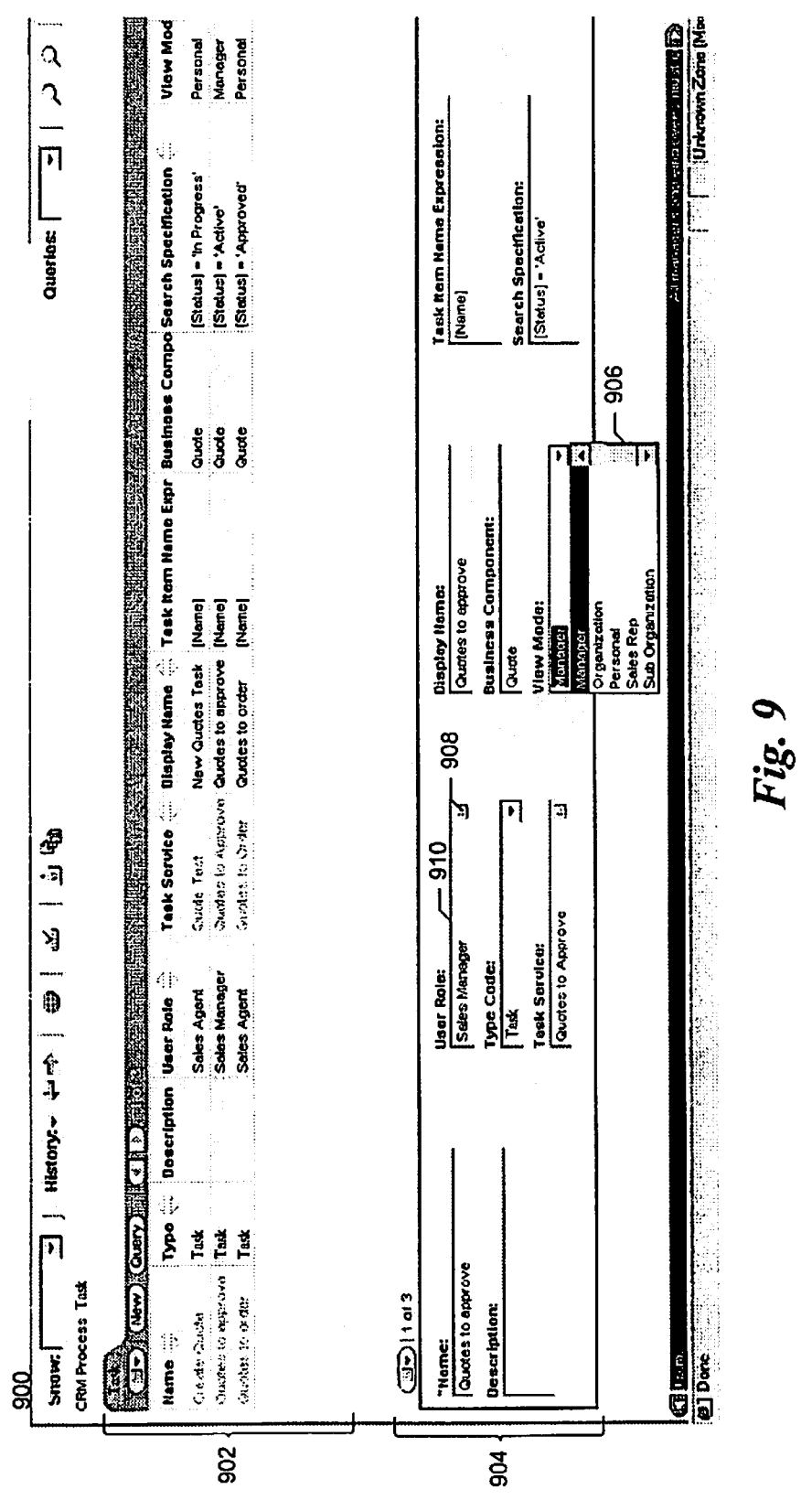

FIG. 9 is a sample user interface showing various viewing components on a task definition page 900. The "TASKS" viewing component 902 lists the tasks in the process that the admin user has already created using, for example, a design tool. If the admin user has not yet assigned any tasks to a process, the "TASKS" viewing component 902 may not display any tasks. Using a lower viewing component 904, the admin user may input or modify details associated with existing tasks. For example, the admin user may modify a task name or input or modify a task description, a task type, a task service or a task display name using the appropriate text fields or pull-down menus of the lower viewing component. A "VIEW MODE" pull-down menu 906 allows the admin user to specify a search parameter or rule that defines what instances of task will be displayed in a particular user's inbox. For example, if the "MANAGER" view mode is selected and the task is "QUOTES TO APPROVE," a sales manager responsible for approving quotes will receive only those instances of quotes that stem from that manager's assigned group of employees. Alternatively, if the "ORGANIZATION" view mode is selected, all instances of quotes within the organization that need approval will show up in a sales manager's task inbox, regardless of their origin.

In some embodiments, the admin user defines an initial user role for the task by selecting the pop-up button 908 in the "USER ROLE" text field 910. Selecting this button will cause the display of a viewing component that allows the admin user to select a role from a list of roles, such as the "ROLES PICKER" viewing component 1002 of FIG. 10.

Figure 10:
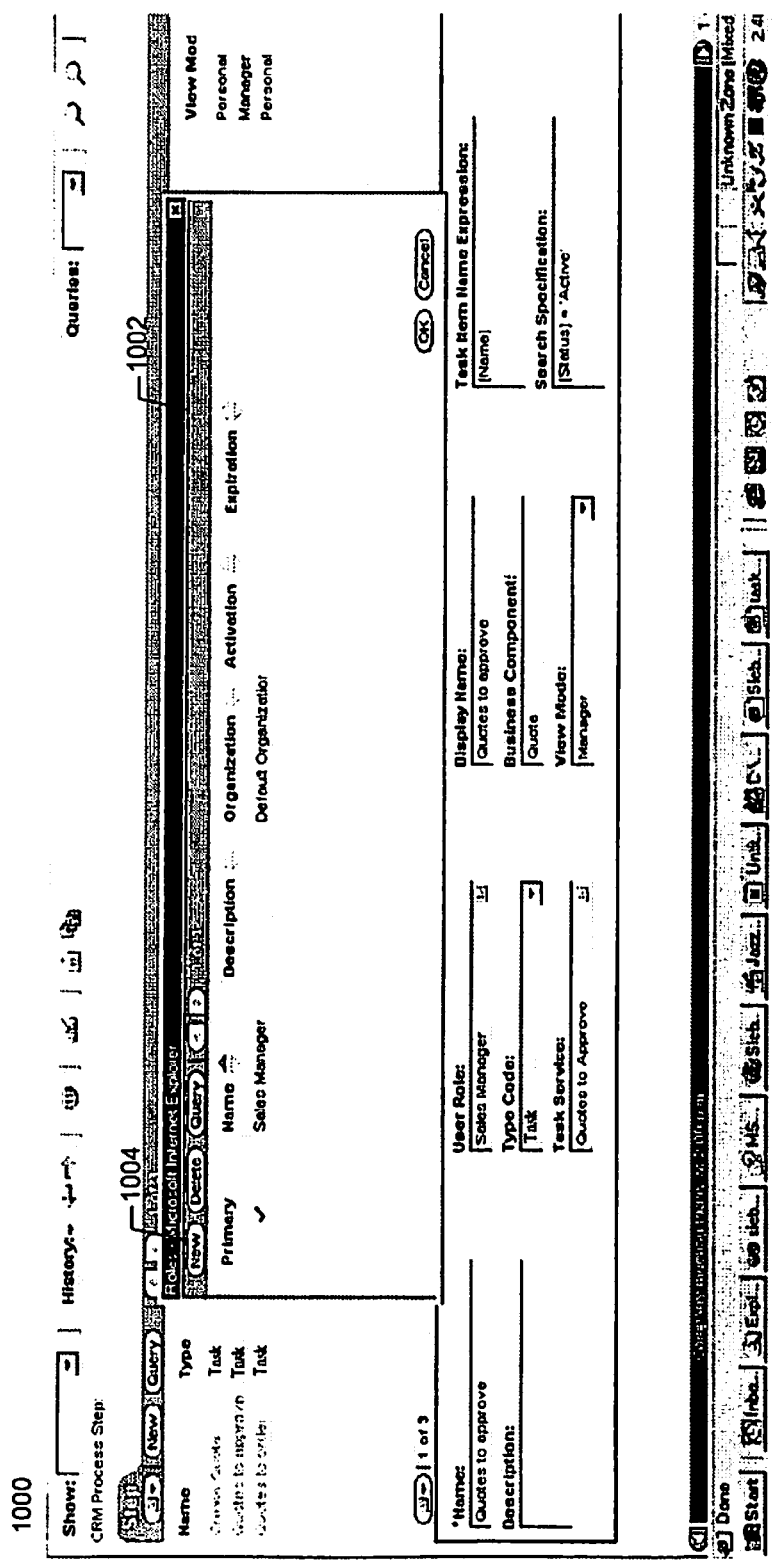
FIG. 10 is a sample user interface showing various viewing components on a process tasks page.

FIG. 10 is a sample user interface showing various viewing components on a process tasks page 1000, including a "ROLES PICKER" viewing component 1002 that allows the admin user to pick a pre-defined role to associate with a task. By defining a user role or collection of user roles for a task, the admin user determines who within the organization is responsible for a specific task. For example, sales managers may be responsible for approving quotes, while sales agents may be responsible for creating quotes. Other examples of roles within an organization include sales operation manager, regional manager, compensation specialist, service specialist, etc. In some embodiments, if the desired role does not exist as a pre-defined roll, it will not be displayed in the "ROLES PICKER" 1002. In such a case, the admin user in some embodiments may select the "NEW" button 1004 associated with the "ROLES PICKER" viewing component 1002 to create a new role.

In some embodiments, once a process is defined by a series of tasks, the admin user may formulate step-by-step instructions to facilitate completion of instances of a task. In some embodiments, this is accomplished by defining tasks in terms of steps and providing instructions for completing each step. The sample user interface diagrams of FIGS. 11 through 16 illustrate the process through which an admin user can define particular steps and instructions for each task within a process.

Figure 11:
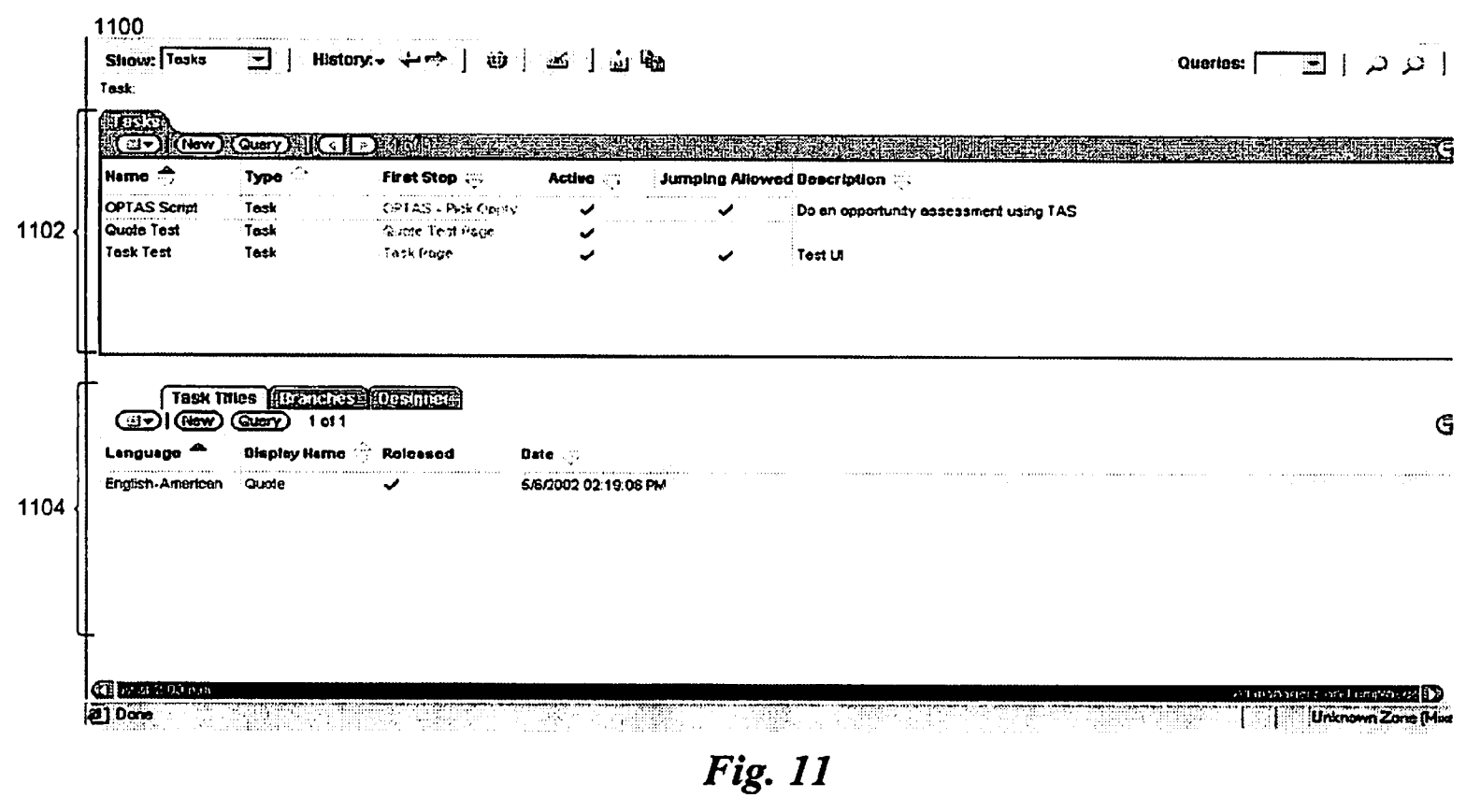

FIG. 11 is a sample user interface showing various viewing components on a task definition page 1100. From this page, the admin user may begin a process of defining or modifying tasks that have been identified as part of a process. The "TASKS" viewing component 1102 displays various tasks that an admin user used to define a specific process. In some embodiments, when the admin user selects one of the tasks listed in the "TASKS" viewing component 1102, a "TASK TITLES" viewing component 1104 displays details regarding the design of the selected task. For example, the "TASK TITLES" viewing component 1104 may display the name of the task as it will be displayed to the user, the date the task was created, the language in which the task will be presented and an indication of whether the task has been released within the organization. Once a task is released, the task then becomes available to the appropriate users within the organization so that they may create and accomplish specific instances of the task.

Figure 12:
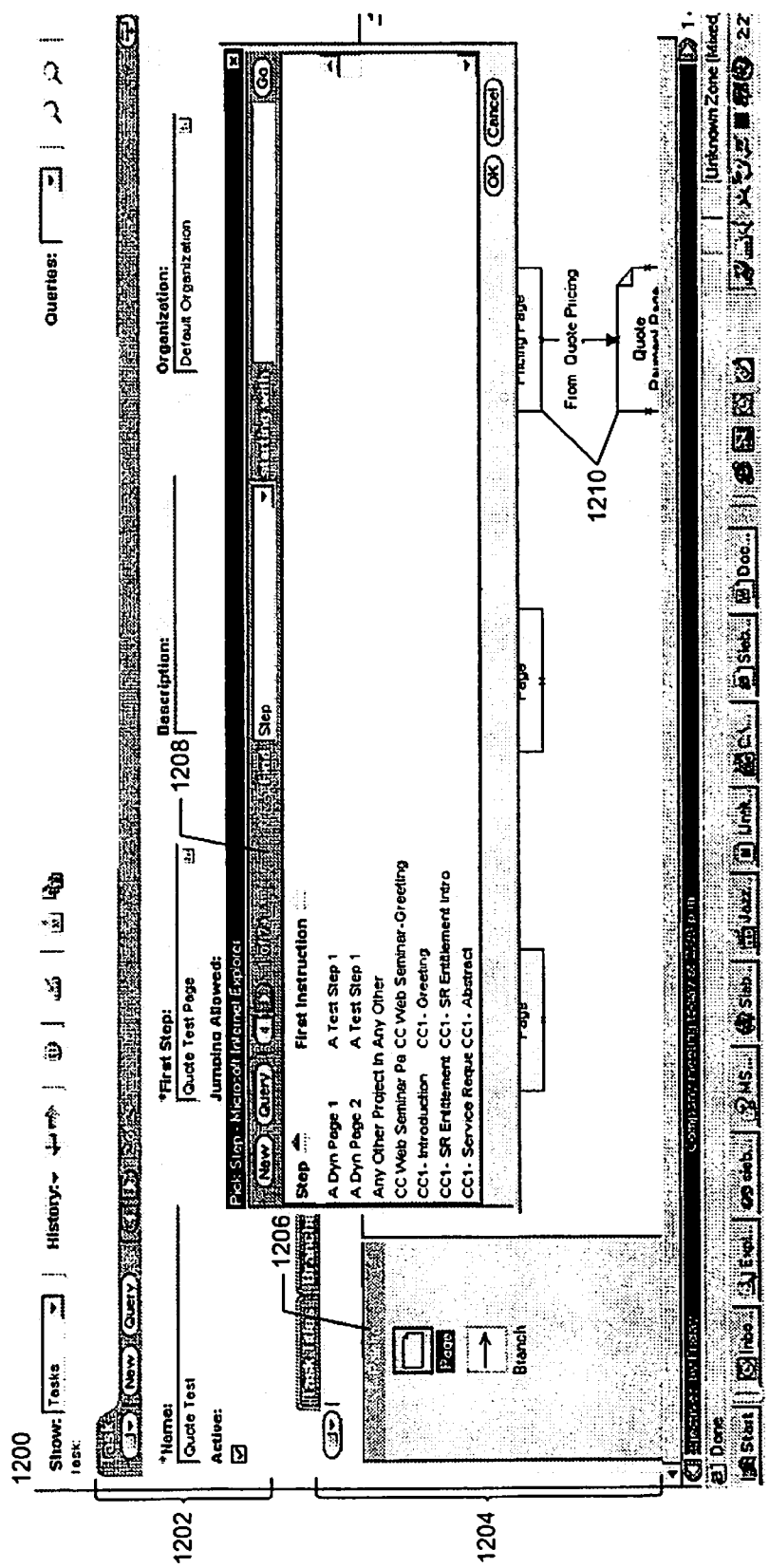
FIG. 12 is a sample user interface showing various viewing components on a task design page.

FIG. 12 is a sample user interface showing various viewing components on a task design page 1200. From this page, the admin user outlines the steps that make up a task. In some embodiments, a "TASK" viewing component 1202 displays general information about the task that was provided by the admin user at the time that the task was specified as a step in a process. In some embodiments, the facility displays a "TASK DESIGNER" viewing component 1204, which may include a design tool, such a graphical designer palette 1206. In some embodiments, the design tool 1206 allows the admin user to define a task as a progression of steps. While the design tool 1206 allows the admin user to create custom steps for each task, in some embodiments the admin user may also be able to define a task by adding steps from a list of existing steps using a "STEP PICKER" 1208. By recycling existing steps, the admin user avoids having to create an entirely new set of instructions for a step. In some embodiments, once the steps in the task are identified, the admin user can then drill into the steps 1210 using the graphical designer palette 1206 to proceed to a step definition page such as the step definition page of FIG. 13. From the step definition page, the admin user can create instructions or modify the instructions and other attributes for the selected step.

Figure 13:
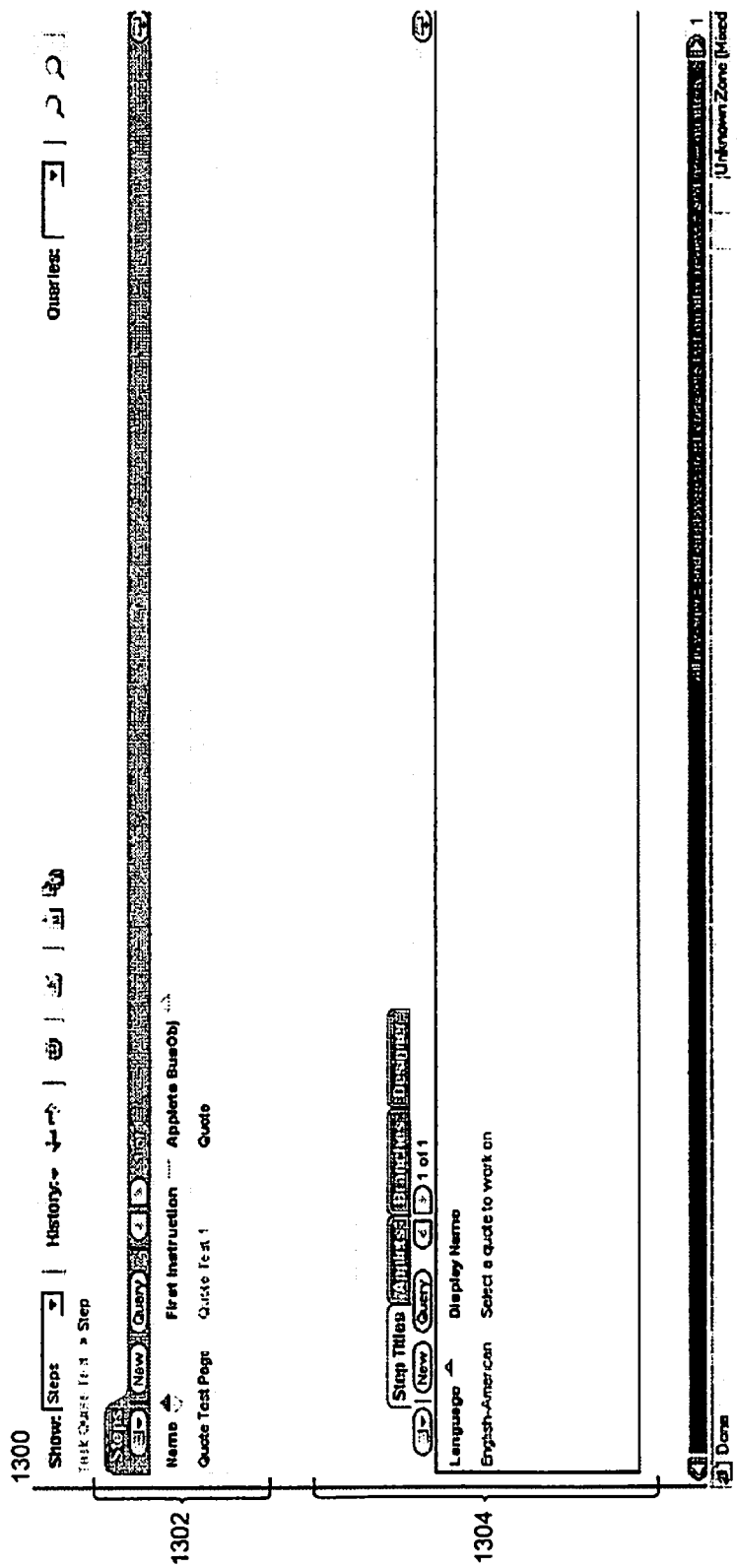
FIG. 13 is a sample user interface showing various viewing components on a step definition page.

FIG. 13 is a sample user interface showing various viewing components on a step definition page 1300. From this page, the admin user may begin a process of defining or modifying steps that have been identified as part of a task. This process may involve designing a user interface for completing the step and providing detailed instruction for completing the step.

In some embodiments, the "STEPS" viewing component 1302 displays a list of the various steps that define a specific task, as outlined in the task definition process described above. In some embodiments, when the admin user selects one of the steps listed in the "STEPS" viewing component 1302, a lower viewing component, such as a "STEP TITLES" viewing component 1304, displays details regarding the design of the selected step. For example, the "STEP TITLES" viewing component 1304 may display the name of the selected step as it will be displayed to a user being guided through the step, and the language in which the step will be presented to the guided user.

Figure 14:
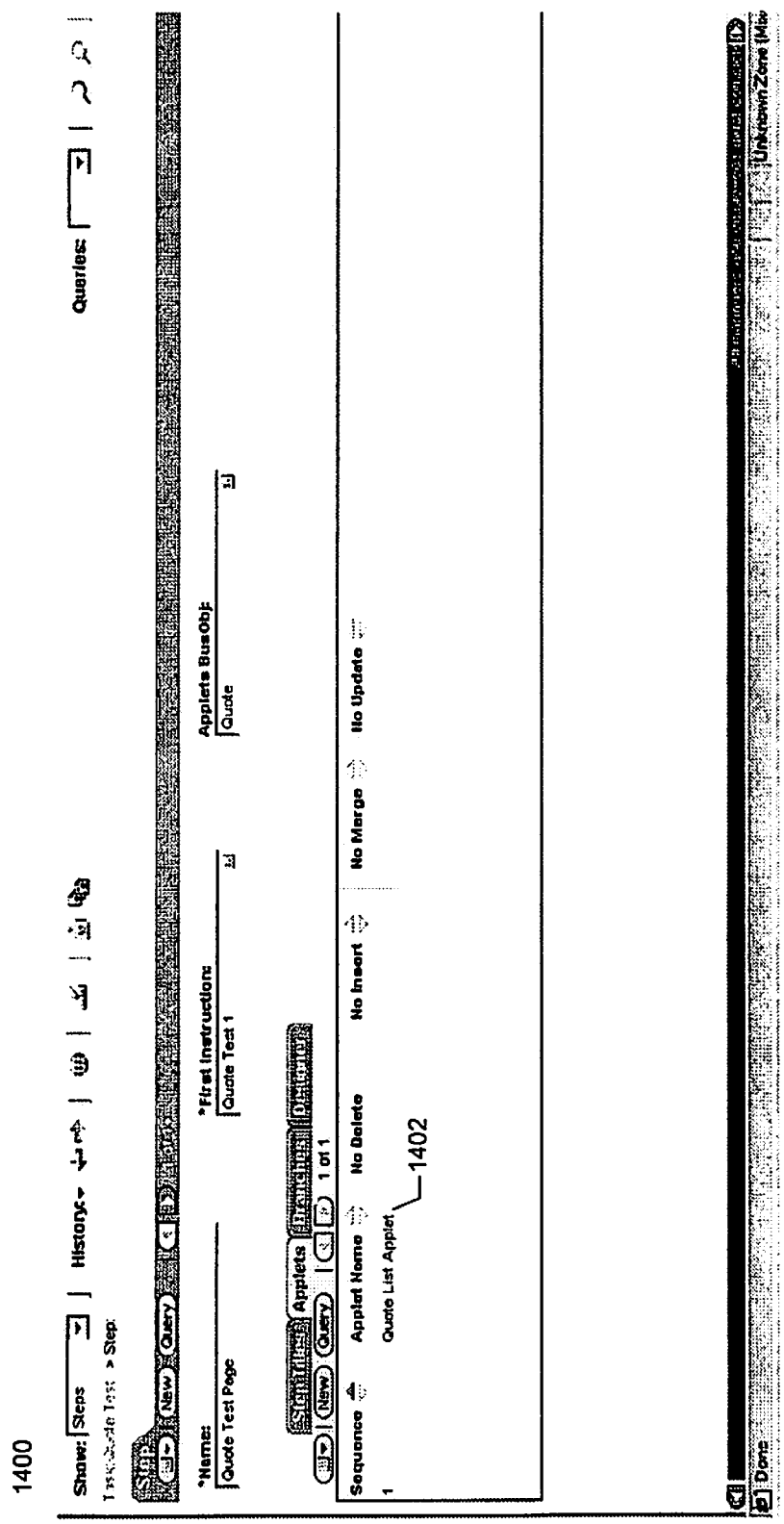
FIG. 14 is a sample user interface showing various viewing components on a step user interface page.

FIG. 14 is a sample user interface showing various viewing components on a step user interface page 1400. From this page, the admin user may associate a step with a unique user interface 1402 to provide textual and graphical examples, step instructions and/or interactive data displays so that a user may efficiently complete each step of a task while being guided by a task guide application. In some embodiments, the user interface may be implemented in the form of a typical viewing component, such as a standard applet. In some embodiments, these viewing components may then be used to reference various business components (as described in the text accompanying FIGS. 1-4), allowing the admin user to decide on the context where she wants data to be displayed, submitted or modified during the task guide application's runtime.

Figure 15:
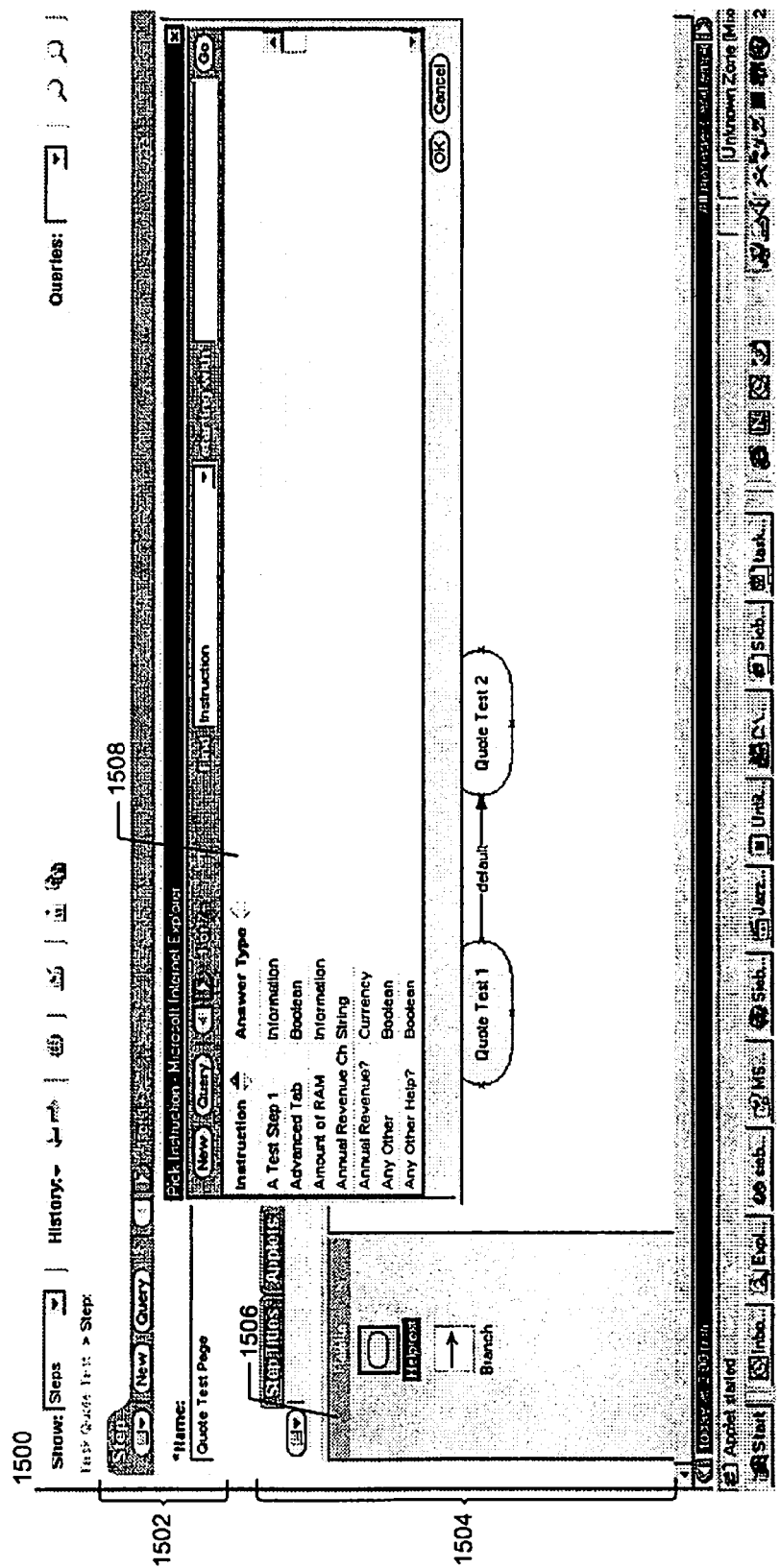
FIG. 15 is a sample user interface showing various viewing components on a step instructions page.

FIG. 15 is a sample user interface showing various viewing components on a step instructions page 1500. From this page, the admin user outlines the instructions necessary to complete a step. The facility may display step instructions to a user while the user is in the process of being guided through the steps of a task. In some embodiments, a "STEP" viewing component 1502 displays general information about the selected step that was provided by the admin user at the time the step was specified as a part of a task.

In some embodiments, the facility displays a "STEP DESIGNER" viewing component 1504 that may include a design tool 1506 such as a design palette that allows the admin user to define a step as a progression of instructions. While the design tool 1506 allows the admin user to create custom instructions for a step, in some embodiments the admin user may also be able to add instructions from a list of existing instructions using an "INSTRUCTION PICKER" viewing component 1508. Several types of instructions may be implemented using the "STEP DESIGNER" 1504, including instructions that request a response from a user such as a question that requires a "yes" or "no" answer, or a question that requires typing information into a text field and textual instructions that direct the user to take some action (e.g., "select a value from the following table").

Figure 16:
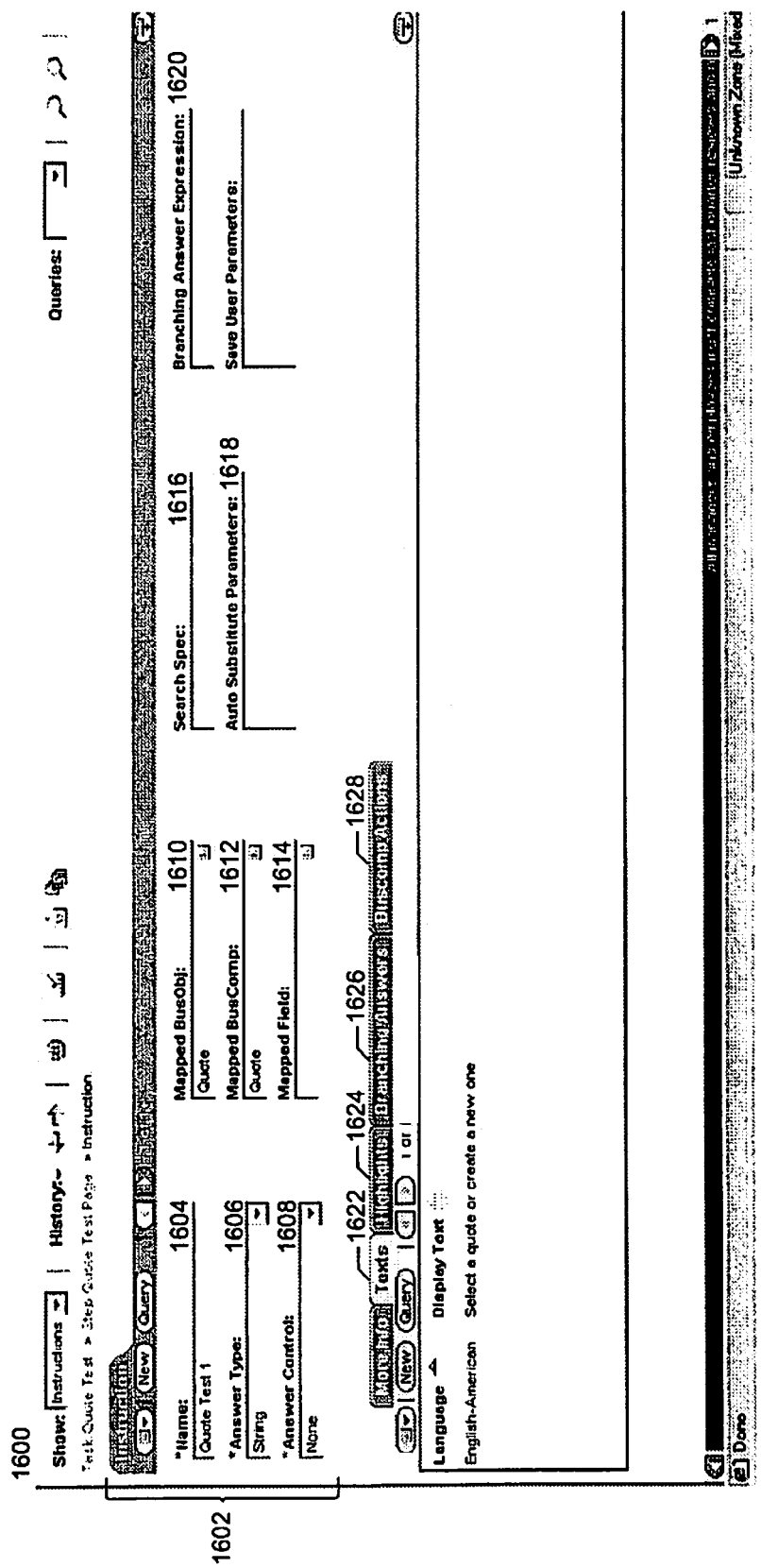
FIG. 16 is a sample user interface showing various viewing components on an instructions details page.

Once an instruction for a step is identified, the admin user can then drill down into the steps defined on the design tool to proceed to an instructions details page such as the instructions details page of FIG. 16. From the instructions details page, the admin user can create instructions or modify the instructions and other attributes for the selected step.

FIG. 16 is a sample user interface showing various viewing components on an instructions details page 1600. From the "INSTRUCTION" viewing component 1602 of the instructions details page 1600, the user may specify the name of an instruction 1604, the answer type for an instruction 1606 and whether the answer is controlled 1608, meaning that only a certain range or type of answer is allowed. Additionally, any corresponding business objects 1610 and/or business components 1612 are identified for mapping so that the data provided by the user being guided through the task may be stored in the appropriate data table. In some embodiments, mapped fields 1614 may also be selected, as well as search specs 1616 that define what types of records will be returned for display to the guided user. Automatic substitute parameters 1618 may also be specified, as well as branching answers 1620.

Some of the instruction creation options available to admin users include viewing components that allow the advanced modification of textual instructions 1622, the specification of highlights 1624 or help text items (e.g., sections of the instructions or displayed viewing components that will be highlighted when the user passes a mouse over them), the definition of branching answers for each instruction 1626 and the definition of businesscomp actions for each instruction 1628. In some embodiments, the facility includes branching logic capabilities that the admin user may use to define dependent steps (i.e., steps in a task that are dependent upon the value entered in a previous step).

Figure 17:
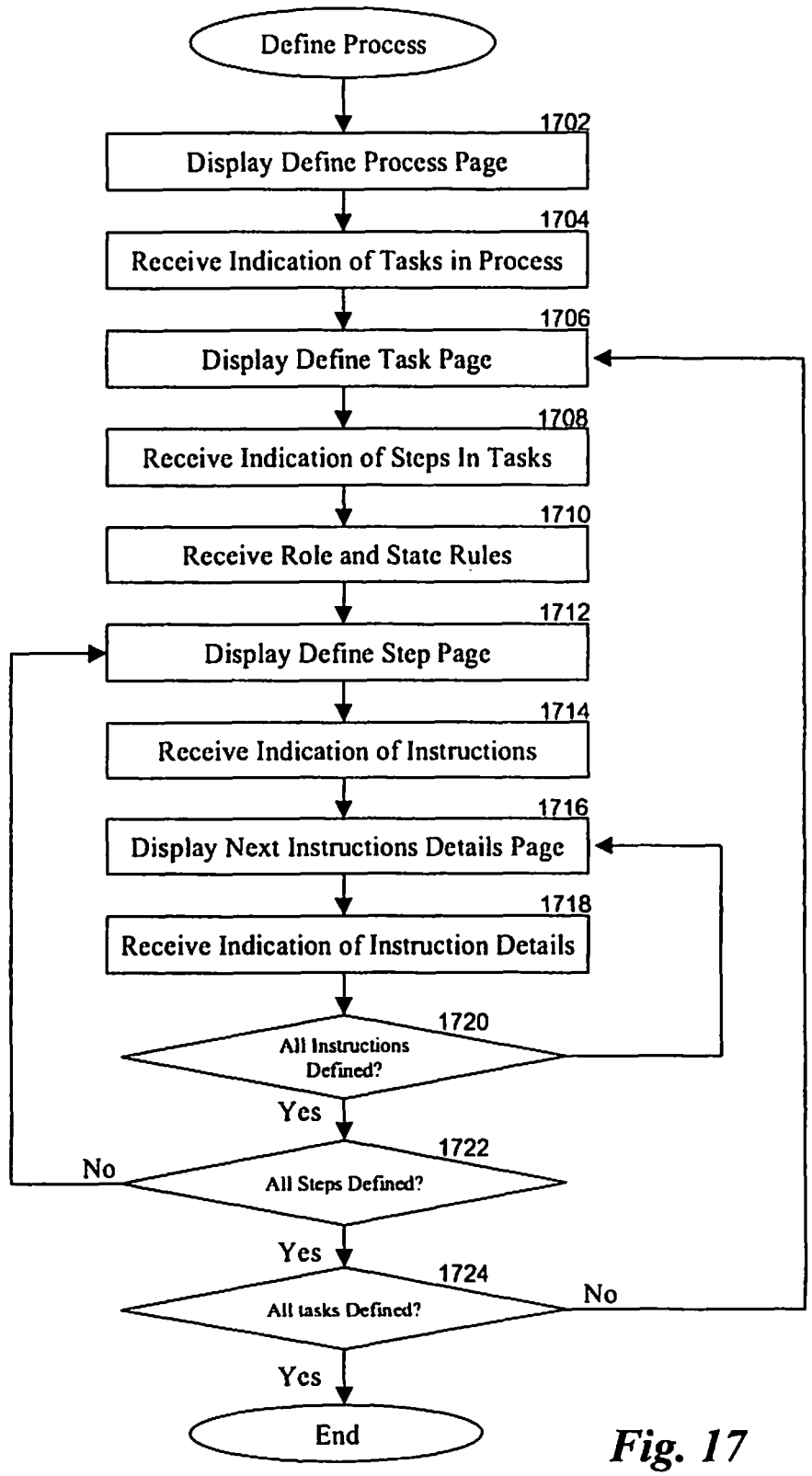
FIG. 17 is a flow diagram showing steps typically performed by the facility to define a process consisting of one or more tasks.

FIG. 17 is a flow diagram showing steps typically performed by the facility to define a process consisting of one or more tasks. In block 1702, the facility displays a page or screen that allows an admin user to define the process by associating one or more tasks with the process. In block 1704, the facility receives from the admin user an indication of one or more tasks, such as the name of the task and its order in the process. In some embodiments, the admin user provides this indication by creating a task flow in a graphic design viewing component.

In block 1706, the facility displays a page, screen or viewing component that allows the user to define a task by associating one or more steps with the task. In some embodiments, the facility displays the page, screen or viewing component in response to a user action event such as selecting a graphical representation of a task that functions as a hyperlink to a task definition screen.

In block 1708, the facility receives from the admin user an indication of one or more steps. In some embodiments, the admin user provides this indication by creating a step flow in a graphic design viewing component. In block 1710, the facility receives additional information about the task, such as rules defining the various roles and states associated with the task.

In block 1712, the facility displays a page or screen that allows the admin user to define a step by associating one or more instructions with the step. In some embodiments, the facility displays the page or screen in response to a user action event such as selecting a graphical representation of a step that functions as a hyperlink to the step definition screen. In block 1714, the facility receives from the admin user an indication of one or more instructions. In some embodiments, the admin user provides this indication by creating an instruction flow in a graphic design viewing component.

In block 1716, the facility displays a page or screen consisting of viewing components that allow the user to define an instruction by providing details about the instruction such as the text, branching answers, highlights for help-text items, etc. In some embodiments, the facility displays the page or screen in response to a user action event such as selecting a graphical representation of an instruction that functions as a hyperlink to the instruction definition screen. In block 1718, the facility receives indications of instruction details for a selected instruction. In decision block 1720, if the facility has received definitions for all the instructions, the facility continues at decision block 1722, else the facility loops back to block 1716, where the facility displays the details page for the next instruction.

In decision block 1722, if all steps are defined, the facility continues at decision block 1724, else the facility loops back to block 1712, where the facility displays the define step page for the next step.

In decision block 1724, if all tasks are defined, the define process routine ends, else the facility loops back to block 1706, where the facility displays the define task page for the next task. Once the process is defined, and the tasks associated with the process are activated, the facility places tasks in user's inboxes and guides the appropriate users through completing tasks based on this definition.

IV. User Task Guide

Once processes, tasks and steps are defined, the facility may guide users through specific instances of tasks via a task-guiding environment. FIGS. 18 through 22 are a series of sample user interface diagrams showing windows or web pages that display a task guiding environment, in which a task guide provides users with instructions on how to complete specific instances of tasks.

Figure 18:
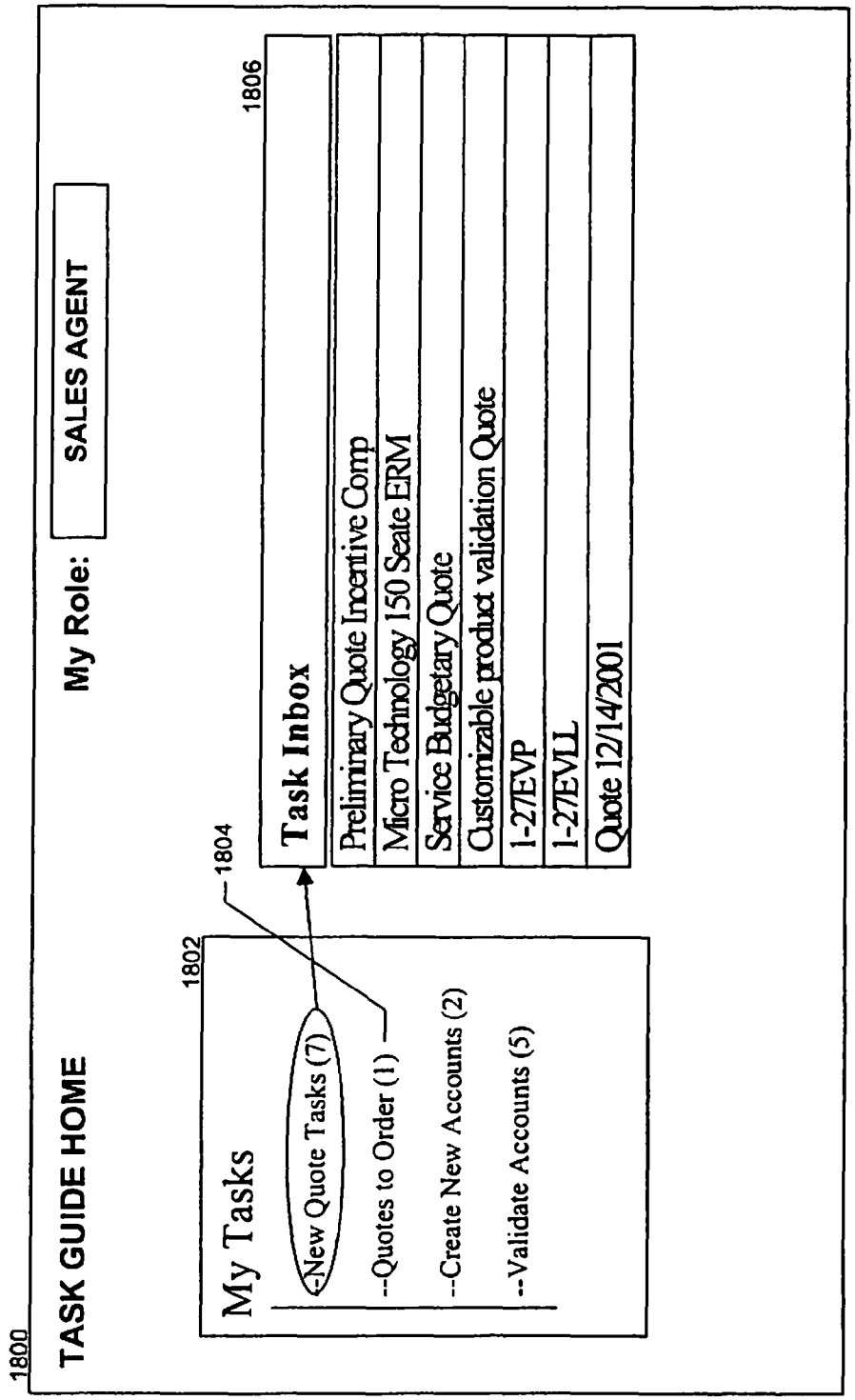
FIG. 18 is a first sample user interface showing a window or web page displaying a task guide home page.

FIG. 18 is a first sample user interface showing a window or web page displaying a task guide home page 800. In some embodiments, the task guide home page is role-based, consisting of a specific set of components, each of which is personalized for a user having a specific job function or role. In some embodiments, the task guide home page includes a "TASK LIST" viewing component 1802 that displays indications of all active or released tasks specific to the user's role. For example, a product manager may have the task of "Approving Quotes," while a product sales agent will have the tasks of "Creating Quotes." In some embodiments, each task listed in the "TASK LIST" viewing component 1802 is followed by an indication 1804 of the number of specific instances of that task that the user will find in his or her "TASK INBOX."

In some embodiments, when the user selects one of the general tasks in the "TASK LIST" 1802 the task instances for that general task belonging to the user will appear in the user's "TASK INBOX" viewing component 1806. Although not shown in FIG. 18, in some embodiments the "TASK INBOX" viewing component 1806 may consist of two or more separate viewing components. For example, the "TASK INBOX" viewing component 1806 may include a first list with all the tasks that can be started by the individual user depending on her role, and a second list with all task instances that are currently assigned to the user or her group. As described with respect to FIG. 9, specific task instances for a user may be identified by a "view mode" search specification that the admin user defines at the process definition stage.

Figure 19:
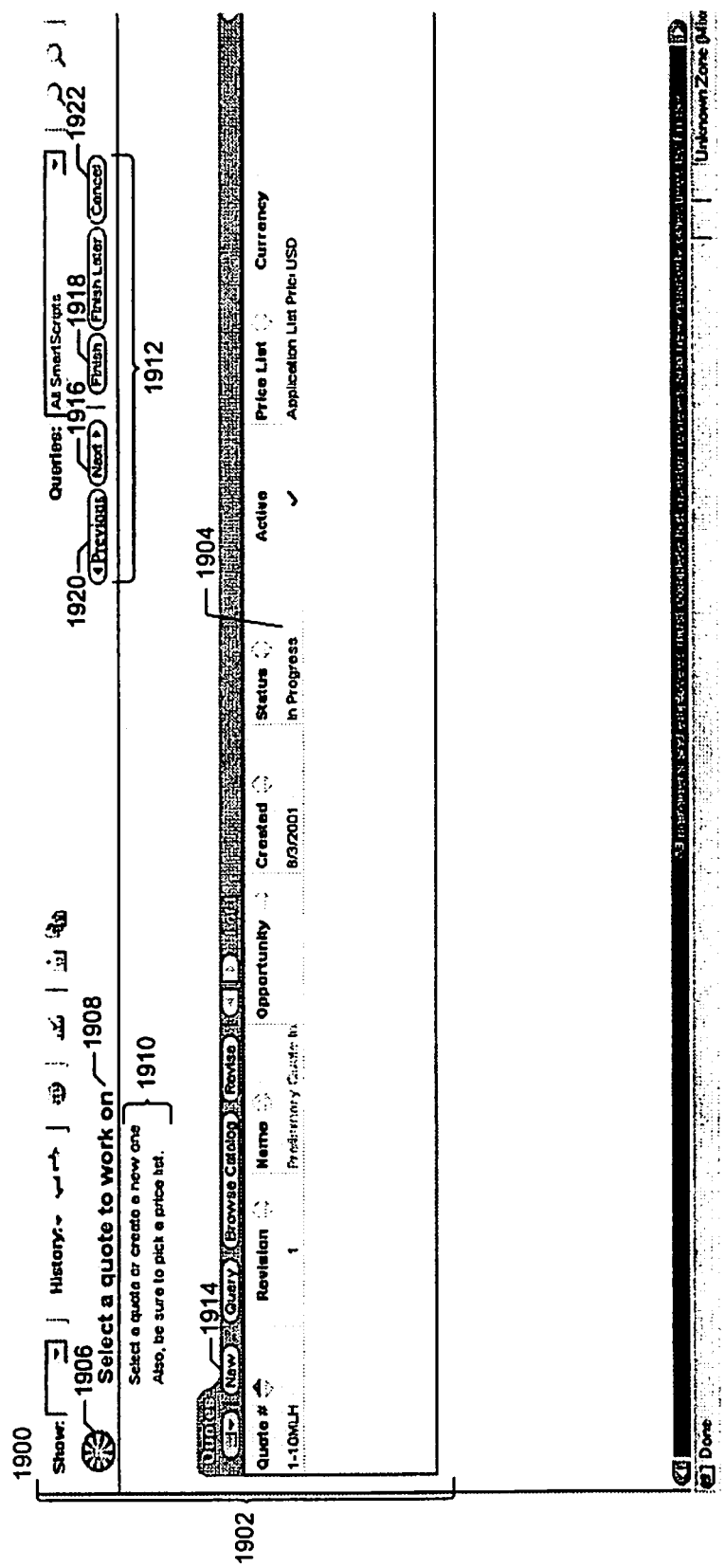
FIG. 19 is a sample user interface showing a window or web page displaying a first step in a task guide for a specific task instance.

In this particular example, the user has seven instances of new quote tasks in her "TASK INBOX" viewing component 1806, including "Preliminary Quote Incentive Comp," "Micro Technology 150 Seate ERM," "Service Budgetary Quote," "Customizable Product Validation Quote," "1-27 EVP," "1-27 EVLL" and "Quote 12/14/2001." If the user selects any one of these task instances, the facility will display a task start page such as the task start page of FIG. 19.

In the case where a particular task item or task instance has yet to be created, the task inbox 1806 may not contain any specific task instances. For example, if the task is "Creating a Quote" a specific instance of the task does not yet exist because no quote has been created. In such a case, however, the user may still access the task-guiding environment in order to create a new instance of the item as show in FIG. 19.

FIG. 19 is a sample user interface showing a window or web page 1900 displaying a first step in a task guide for a specific task instance, in this case "Preliminary Quote Incentive Comp." In some embodiments, when the user selects a task instance from the task guide home page 1800, the facility automatically hides all screens and viewing components not required to complete the selected task and navigates the user to viewing component 1902, where the first step of the task can be completed. In some embodiments, the facility will automatically update specified task fields such as the state or status 1904 of the task as the user carries out each step required to complete the task. For example, the facility may mark completed steps as completed and uncompleted steps as uncompleted. In some embodiments, the task guide will remain in view until the task or step is completed.

In some embodiments, each page or step of the task guide contains a task-identifying task icon 1906, a step title 1908 (e.g., "Select a quote to work on"), various instructional steps 1910, navigation buttons 1912 and other user interface tools that allow the user to easily complete each step of the task. In some embodiments, the task icon 1906 is specific to the general task being displayed in the task guide and may also be placed next to a task on the "TASK LIST" viewing component 1802 on the user's home page 1800. In some embodiments, the facility may display the task icon 1906 on each task guide page until the user has completed the task.

In some embodiments, the task guide displays various instructions 1910 for each step in the task. In some embodiments, these instructions correspond with other user interface tools displayed on the start page such as tables, menus, text fields, text areas and checkboxes. The instructions and user interface tools may be used together to assist or guide a user in moving toward completion of the task. For example, as shown in FIG. 19, the user is instructed to select a quote from the list of quotes presented in the display. In this example, as the instructions indicate, the facility provides the user with the option of creating a new quote that is not included on the quote list. In such a case, the user selects the "NEW" button 1914 to be guided through the steps of creating a new quote. Once created, the new quote will become its own task instance.

In some embodiments, the pages of the task guide may include navigation buttons 1912 such as "NEXT" 1916, "FINISH" 1918, "PREVIOUS" 1920 and "CANCEL" 1922. In some embodiments, selecting the "NEXT" button 1916 will cause the facility to display the next step (or set of steps) required to complete the task. If the next step will be completed on a new page, screen or viewing component, then the facility will automatically navigate the user to that view. When the user completes all the steps associated with a task, the "NEXT" button 1916 changes to "FINISH" 1918 in some embodiments. In some embodiments, the "PREVIOUS" button 1920 displays the previous step (or set of steps) that the facility displayed to the user. Selection of the "CANCEL" button 1922 causes the facility to display a task guide home page 1800.

In some embodiments, the user can perform more than one step in a single viewing component or screen. In such a case, the facility or the admin user may group the instructions for those steps into a single page of the task guide. In some embodiments, if there is not enough room in the task guide for all the instructions that the user is instructed to follow to complete all the steps associated with a particular viewing component, the facility will automatically break the steps up and display them in separate viewing components of the task guide.

Figure 20:
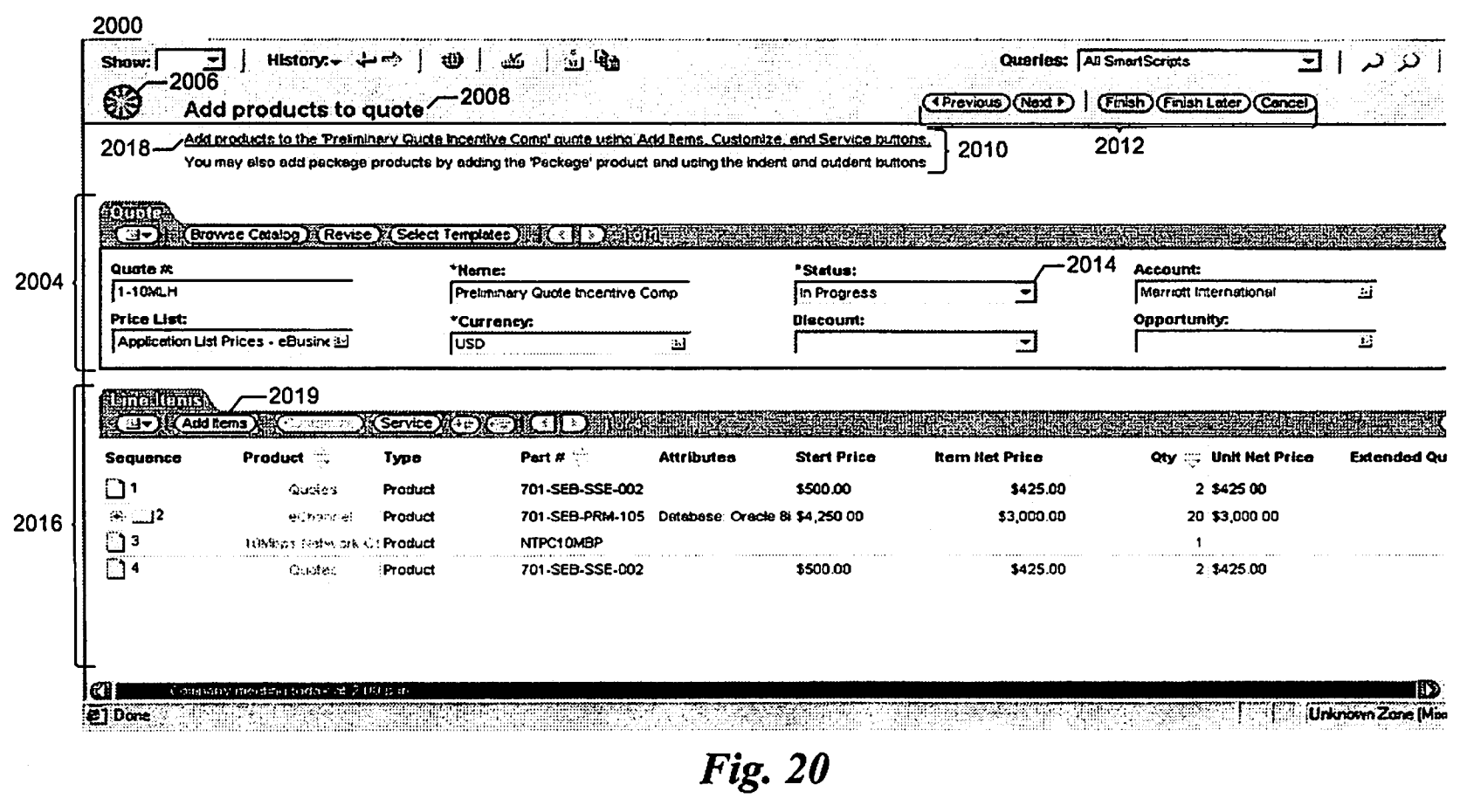

FIG. 20 is a sample user interface showing a window or web page 2000 displaying a second step in a task guide for a specific task instance, in this case "Preliminary Quote Incentive Comp." In addition to the task icon 2006, task step label 2008, instruction section 2010 and navigational buttons 2012, the second page of the task guide in this particular example includes a "Quote" section 2004 that provides the details of the specific instance of a task (e.g., quote no. 1-10 OMLH). In some embodiments, the user may manually update the state or status of the quote 2014 by using the pull-down menu. Alternatively, the facility may automatically update the state as the user proceeds to complete the task step-by-step.

In some embodiments, the facility displays a lower viewing component 2016 that contains the fields and user interface controls that the user modifies in order to complete the step by following the provided instructions. In this particular example, the user is instructed to add products to the preliminary quote incentive comp quote using the add items button 2019 provided in the lower viewing component 2016 (e.g., "LINE ITEMS"), which contains various fields and controls.

In some embodiments, a step may have one or more help text items 2018. A help text item may function as a hyperlink that, when selected, causes individual fields in the current viewing component to become highlighted. In some embodiments, a help text item can be tied to one or more individual fields in a viewing component. In some embodiments, one area of the viewing component may contain a list of the help texts for the current step.

Figure 21:
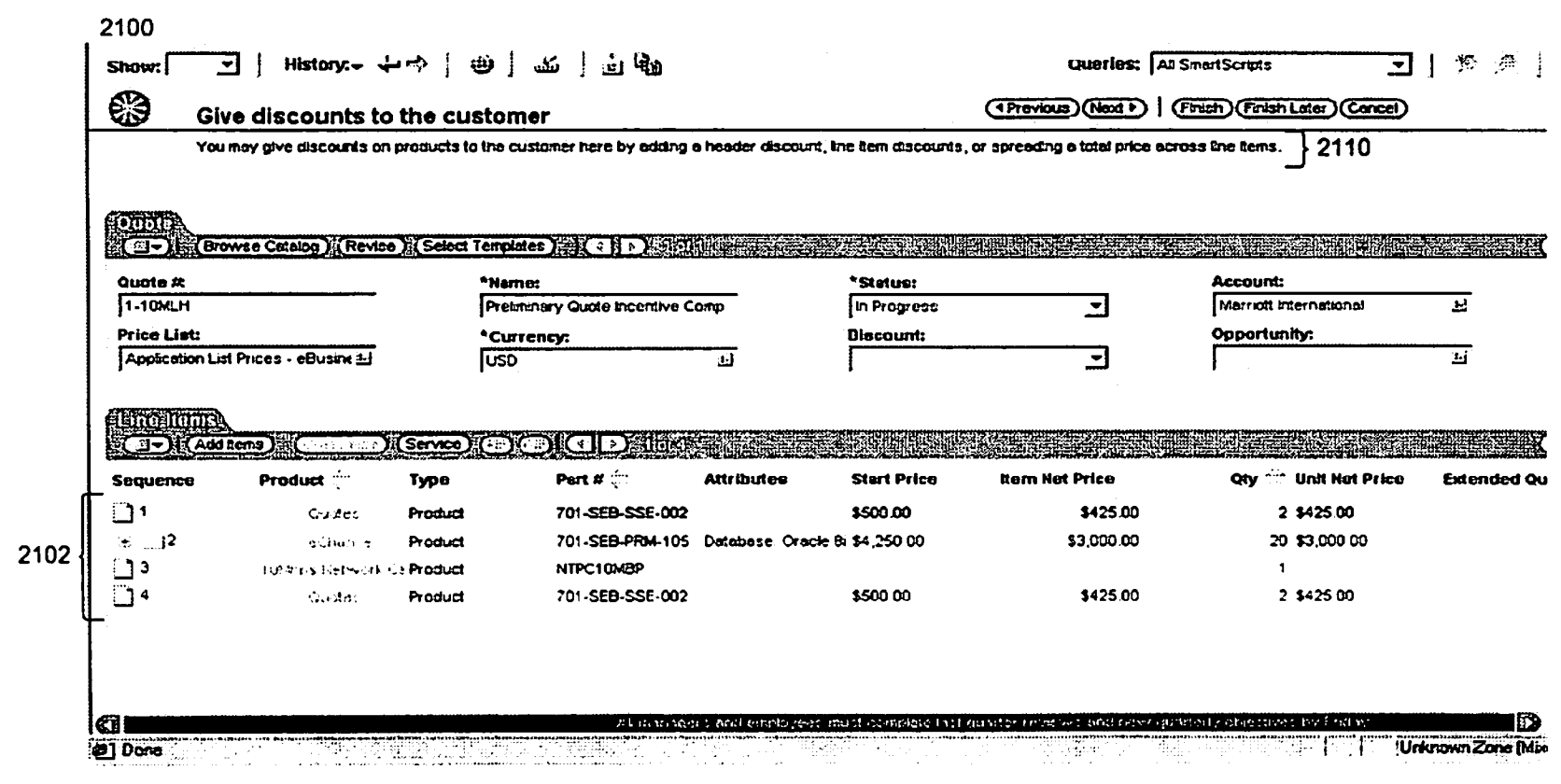

FIG. 21 is a sample user interface showing a window or web page 2100 displaying a third step in a task guide for a specific task instance. The task instructions 2110 in this particular example instruct the user how to give product discounts to a customer. The user is presented with a list of line items 2102 through which the user may select the discounts that the user wishes to give to the customer. In some instances, the facility allows for drilling down through lists and data table items to view additional information.

Figure 22:
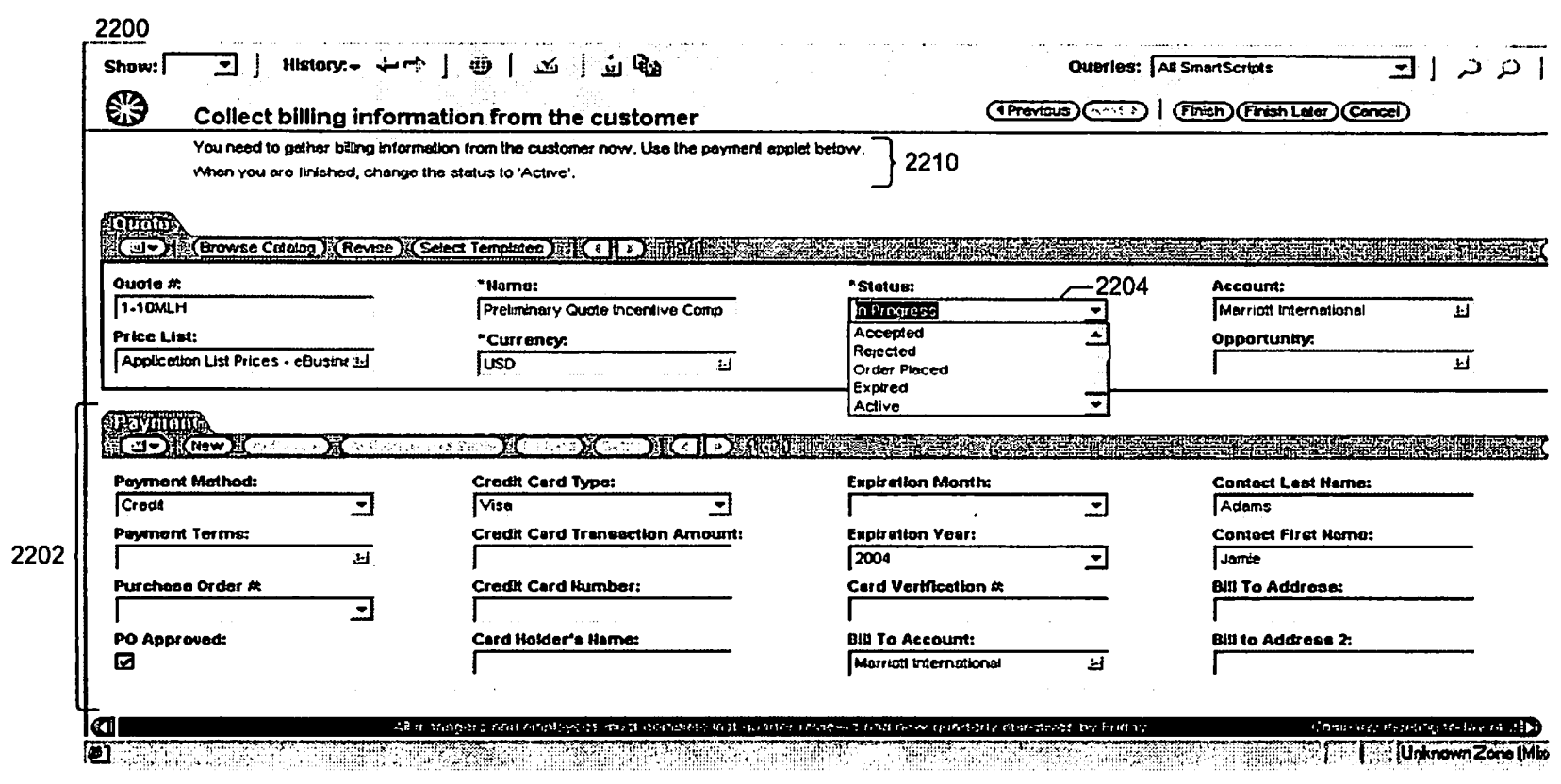

FIG. 22 is a sample user interface showing a window or web page 2200 displaying a final step in a task guide for a specific task instance. In this particular example, the facility instructs the user to gather billing information from the customer 2210. In some embodiments, the user completes such a step by entering values into various text fields, pull-down menus, etc.

For example, the "PAYMENT" viewing component 2202 contains several text fields and pull-down menus from which the user may enter payment information for the customer. In some embodiments, where the facility does not automatically update the state or status of the task, the user may use the "STATUS" drop-down menu 2204 to update the state or status of the task, as the instructions 2210 provide. In some embodiments, when the user has finished the final step, the user selects the "FINISH" button 2218.

Figure 23:
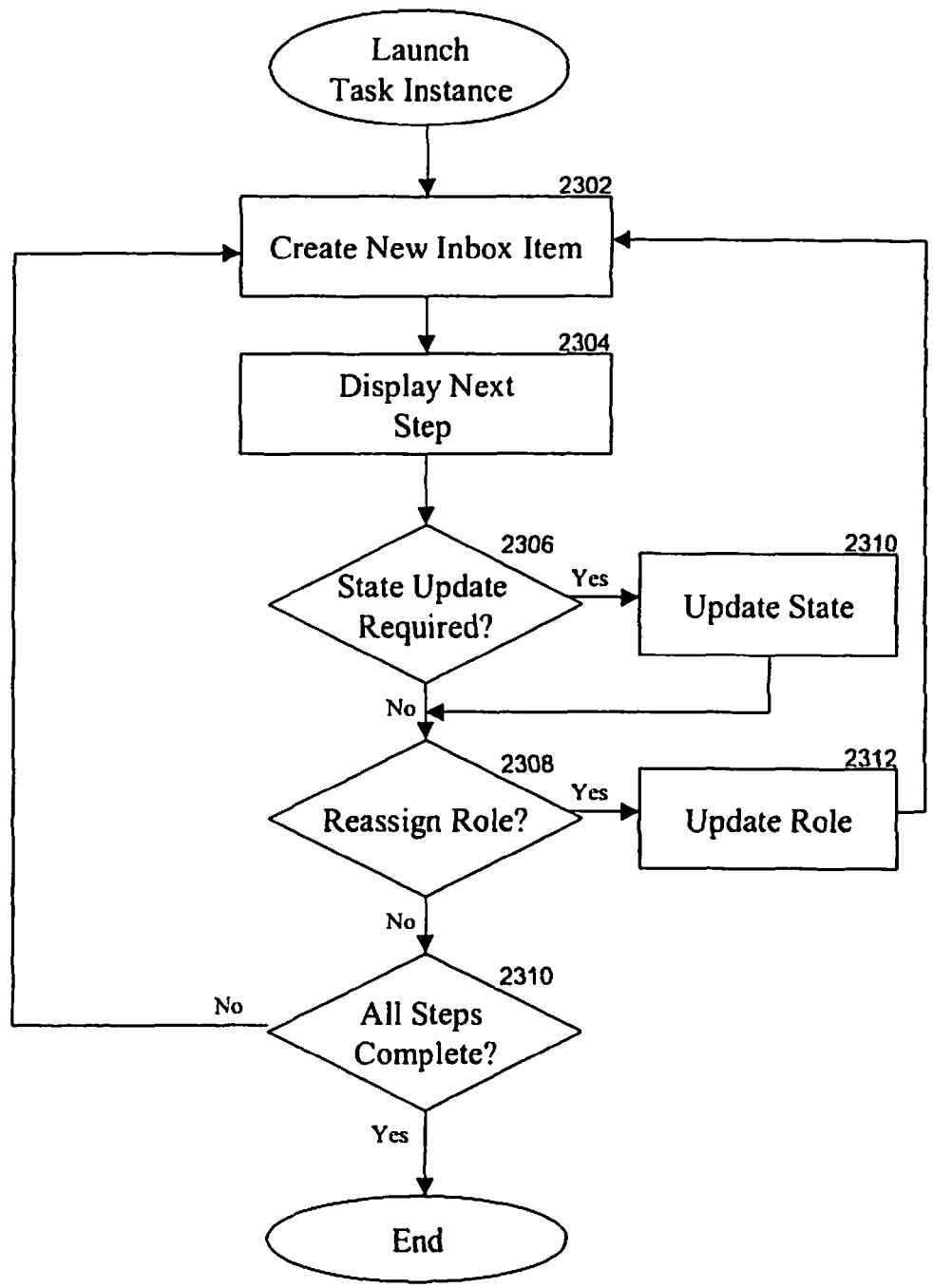
FIG. 23 is a flow diagram showing steps typically performed by the facility to guide one or more users through a task.

FIG. 23 is a flow diagram showing steps typically performed by the facility to guide one or more users through a task. In block 2302, the facility creates a specific instance of a task that the facility will display in a user's inbox. The facility can create a new inbox item in various contexts. For example, in the case where a specific instance of a task does not yet exist (e.g., "create a new quote"), the facility, in some embodiments, creates a new inbox item in response to a user indication to create a new task instance. In the case where a specific instance of a task has already been created (e.g., "approve quote"), the facility, in some embodiments, creates a new inbox item after the role associated with the task instance is updated.

In block 2304, the facility displays a user interface that guides the user through the next step in the step guide. In some embodiments, this may include displaying textual instructions, graphical instructions, tables, text fields, dialogue boxes, etc. that allow the user to perform the step. In decision block 2306, the facility checks to see if a state update for the task is required. If no update is required, then the facility continues at decision block 2308, else the state is updated in block 2310 before the facility continues at decision block 2308. In decision block 2308, the facility checks to see if the role should be reassigned upon completion of the step. If the role does not need to be reassigned, then the facility continues at decision block 2310, else the facility updates the role at block 2312 before looping back to block 2302, where the facility creates a new instance of the task which will appear in the inbox of the individual or individuals that are associated with the updated role. In decision block 2310, if all steps are completed, then the routine ends, else the routine loops back to block 2302 where the routine displays the next step.

V. Conclusion

From the foregoing it will be appreciated that specific embodiments of the invention have been described herein for purposes of illustration, but that various modifications may be made without deviating from the spirit and scope of the invention. For example, while processes consisting of a series of tasks and tasks consisting of a series of steps are described, a person of ordinary skill in the art would appreciate that various different organizations of process related concepts may be utilized or referenced without departing from the scope of the invention. Moreover, while various examples of user interface tools for allowing admin users to define processes and guiding users through tasks and steps are provided, other mechanisms for interfacing with the facility may be employed without departing from the scope of the invention. For example, users may be guided through tasks via the use of audio instructions, video instructions, animated graphical representations, etc. Accordingly, the invention is not limited except as by the appended claims.

We claim:

1. A method for specifying a process definition for a process, wherein the specifying the process definition comprises:
processing a plurality of user inputs associated with the process and received at a computing system, wherein the plurality of user inputs specify:
a series of tasks that define the process,
plurality of steps that define an initial task of the series of tasks,
instructions for completing the plurality of steps of the initial task,
a plurality of states for the initial task associated with the plurality of steps, and
a plurality of roles for the initial task associated with the plurality of states of the initial task;
executing a runtime instance of the process, wherein
each of the plurality of states is used to identify a corresponding role of the plurality of roles for each step of the plurality of steps,
the plurality of roles are used to identify a plurality of users who are responsible for completing the steps of the initial task, and
each user of the plurality of users is associated with a specific step of the initial task; and
updating for the initial task, a state of the plurality of states upon completion of a step of the plurality of steps of the initial task,
wherein the state of the plurality of states is updated if the corresponding role of the plurality of roles associated with the state of the plurality of states has changed, and
wherein the process definition of the process is created based on the processing of the plurality of user inputs, wherein
the plurality of user inputs are received at a user interface of the computer system,
the series of tasks are associated with a set of business rules managed independently by an object manager, and
the object manager provides an abstraction layer between the user interface of the computer system and implementation of the series of tasks by a data manager, and
the data manager provides logical views of data to the user and allow the object manager to function independently of underlying data structure.

2. The method of claim 1 further comprising
processing user input specifying information for guiding users toward completion of a first step of the steps, wherein
the processed user input specifying information for guiding users toward completion of the first step comprises a specification of textual instructions and a specification of help text items.

3. The method of claim 1 further comprising
processing user input specifying information for guiding users toward completion of a first step of the steps, wherein
the processed user input specifying information for guiding users toward completion of the first step comprises a specification of a step-specific viewing component for displaying and receiving information related to completion of the first step.

4. The method of claim 1 further comprising
processing user input specifying information for guiding users toward completion of a first step of the steps, wherein
the processed user input specifying information for guiding users toward completion of the first step comprises a specification of branching answers that define the sequence and selection of instructions provided to users while being guided toward completion of the first step.

5. A non-transitory computer readable medium (CRM) comprising instructions executable by a computing system to implement a method for specifying a process definition for a process, the method comprising:
processing a plurality of user inputs associated with the process and received at the computing system, wherein the plurality of user inputs specify:
a series of tasks that define the process,
plurality of steps that define an initial task of the series of tasks,
instructions for completing the plurality of steps of the initial task,
a plurality of states for the initial task associated with the plurality of steps, and
a plurality of roles for the initial task associated with the plurality of states of the initial task;
executing a runtime instance of the process, wherein
each of the plurality of states is used to identify a corresponding role of the plurality of roles for each step of the plurality of steps,
the plurality of roles are used to identify a plurality of users who are responsible for completing the steps of the initial task, and
each user of the plurality of users is associated with a specific step of the initial task; and
updating for the initial task, a state of the plurality of states upon completion of a step of the plurality of steps of the initial task,
wherein the state of the plurality of states is updated if the corresponding role of the plurality of roles associated with the state of the plurality of states has changed, and
wherein the process definition of the process is created based on the processing of the plurality of user inputs, wherein
the plurality of user inputs are received at a user interface of the computer system,
the series of tasks are associated with a set of business rules managed independently by an object manager, and
the object manager provides an abstraction layer between the user interface of the computer system and implementation of the series of tasks by a data manager, and
the data manager provides logical views of data to the user and allow the object manager to function independently of underlying data structure.

6. The non-transitory CRM of claim 5 wherein
the method further comprises processing user input specifying information for guiding users toward completion of a first step of the steps, wherein
the processed user input specifying information for guiding users toward completion of the first step comprises a specification of textual instructions and a specification of help text items.

7. The non-transitory CRM of claim 5 wherein
the method further comprises processing user input specifying information for guiding users toward completion of a first step of the steps, wherein
the processed user input specifying information for guiding users toward completion of the first step comprises a specification of a step-specific viewing component for displaying and receiving information related to completion of the first step.

8. The non-transitory CRM of claim 5 wherein
the method further comprises processing user input specifying information for guiding users toward completion of a first step of the steps, wherein
the processed user input specifying information for guiding users toward completion of the first step comprises a specification of branching answers that define a sequence and selection of instructions provided to users while being guided toward completion of the first step.

9. A system comprising:
a processor;
a memory comprising instructions executable by the processor to implement a method for specifying a process definition for a process, the method comprising:
processing a plurality of user inputs associated with the process and received at a computing system, wherein the plurality of user inputs specify:
a series of tasks that define the process,
plurality of steps that define an initial task of the series of tasks,
instructions for completing the plurality of steps of the initial task,
a plurality of states for the initial task associated with the plurality of steps, and
a plurality of roles for the initial task associated with the plurality of states of the initial task;
executing a runtime instance of the process, wherein
each of the plurality of states is used to identify a corresponding role of the plurality of roles for each step of the plurality of steps,
the plurality of roles are used to identify a plurality of users who are responsible for completing the steps of the initial task, and
each user of the plurality of users is associated with a specific step of the initial task; and
updating for the initial task, a state of the plurality of states upon completion of a step of the plurality of steps of the initial task,
wherein the state of the plurality of states is updated if the corresponding role of the plurality of roles associated with the state of the plurality of states has changed, and
wherein the process definition of the process is created based on the processing of the plurality of user inputs, wherein
the plurality of user inputs are received at a user interface of the computer system,
the series of tasks are associated with a set of business rules managed independently by an object manager, and
the object manager provides an abstraction layer between the user interface of the computer system and implementation of the series of tasks by a data manager, and
the data manager provides logical views of data to the user and allow the object manager to function independently of underlying data structure.

10. The system of claim 9 further comprising
processing user input specifying information for guiding users toward completion of a first step of the steps, wherein
the processed user input specifying information for guiding users toward completion of the first step comprises a specification of textual instructions and a specification of help text items.

11. The system of claim 9 further comprising
processing user input specifying information for guiding users toward completion of a first step of the steps, wherein
the processed user input specifying information for guiding users toward completion of the first step comprises a specification of a step-specific viewing component for displaying and receiving information related to completion of the first step.

12. The system of claim 9 further comprising
processing user input specifying information for guiding users toward completion of a first step of the steps, wherein
the processed user input specifying information for guiding users toward completion of the first step comprises a specification of branching answers that define the sequence and selection of instructions provided to users while being guided toward completion of the first step.

* * * * *